(12) United States Patent
Tanabe

(10) Patent No.: US 6,535,690 B2
(45) Date of Patent: Mar. 18, 2003

(54) CAMERA HAVING MECHANICALLY LINKED ZOOM LENS, RETRACTABLE FLASH DEVICE AND VARIABLE FLASH ANGLE

(75) Inventor: Minoru Tanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/901,627

(22) Filed: Jul. 11, 2001

(65) Prior Publication Data

US 2002/0009297 A1 Jan. 24, 2002

(30) Foreign Application Priority Data

Jul. 14, 2000 (JP) ........................................ 2000-214189

(51) Int. Cl.[7] ............................................. G03B 15/03
(52) U.S. Cl. ......................................... 396/62; 396/349
(58) Field of Search ............................ 396/62, 61, 175, 396/177, 178, 176, 349

(56) References Cited

U.S. PATENT DOCUMENTS 4,951,074 A * 8/1990 Ueda ........................... 396/62
5,250,972 A   10/1993 Hirohata et al. ............ 354/288
5,331,362 A * 7/1994 DiRisio ........................ 396/62
5,652,920 A * 7/1997 Kaihara et al. ............... 396/62
5,694,627 A * 12/1997 Taguchi ...................... 396/175
5,937,217 A   8/1999 Ohtsuka et al. ............. 396/310

FOREIGN PATENT DOCUMENTS

JP          10-104696      4/1998     ........... G03B/15/05

* cited by examiner

*Primary Examiner*—W. B. Perkey
(74) *Attorney, Agent, or Firm*—Fitzpatrick, Cella, Harper & Scinto

(57) ABSTRACT

A camera includes a flash device movable between a withdrawn position, in which the flash device is received in a camera body, and an in-use position, in which the flash device protrudes from the camera body, an illumination-angle-varying mechanism for changing the illumination angle of the flash device, a lens barrel which is movable for magnification variation, and an operation-linkage mechanism serving, in mechanical linkage with the movement of the lens barrel, to move the flash device from the withdrawn position to the in-use position and to operate the illumination-angle-varying mechanism while the flash device is moving from the withdrawn position to the in-use position.

6 Claims, 22 Drawing Sheets

CAMERA HAVING MECHANICALLY LINKED ZOOM LENS, RETRACTABLE FLASH DEVICE AND VARIABLE FLASH ANGLE

BACKGROUND OF THE INVENTION

1. Field of the Invention

The present invention relates to cameras, and in particular, to a camera with a flash device incorporated therein.

2. Description of the Related Art

Hitherto, cameras with flash devices incorporated therein have been devised and commercialized, in which the flash devices protrude from camera bodies only when the cameras are in use, and the illumination angles of the flash devices can be changed by interlocking the movement of the flash devices with zooming of imaging lenses.

A camera with a flash device incorporated therein is disclosed in, for example, Japanese Patent Laid-Open No. 10-104696, in which a flash device protrudes and withdraws in linkage with the movement of an imaging-lens barrel along the optical axis, and the illumination angle of the flash device varies in linkage with zooming of an imaging lens.

In the disclosed camera described above, the linkage between the imaging-lens barrel and the flash device is performed by distributing power to a cam member for advancing and withdrawing the flash device and for moving a flash discharge tube from driving gears for driving the imaging-lens barrel along the optical axis. The cam member includes rotating cams, each being continuously disposed on the periphery of a rotating member at a rotational angle corresponding to a driving range of protrusion-withdrawal of the flash device or to a movement range of the flash discharge tube. Therefore, each cam is provided with an effective rotational angle for only one rotation of the rotating member for a cam follower, whereby there is restriction in designing driving power, space, and the like. Since power is also transmitted to the driving member for advancing and withdrawing the flash device while moving the flash discharge tube, the position of the driving member for the advancement and withdrawal is restricted by a spring. Therefore, an additional load is applied to the system as a result of the spring.

SUMMARY OF THE INVENTION

Accordingly, it is an object of the present invention to provide a camera in which a drawback resulting from increased load described above is overcome.

To that end, according to an aspect of the present invention, a camera comprises a flash device movable between a withdrawn position in which the flash device is received in a camera body and an in-use position; an illumination-angle-varying mechanism for changing an illumination angle of the flash device; a lens barrel which is movable for magnification variation; and an operation-linkage mechanism serving, in linkage with movement of the lens barrel, to move the flash device from the withdrawn position to the in-use position and to operate the illumination-angle-varying mechanism while the flash device is moving from the withdrawn position to the in-use position.

In a camera according to the present invention, the flash device may include a light source and an optical panel. The illumination-angle-varying mechanism may include a first lever for changing the distance between the light source and the optical panel.

The flash device may be urged toward the in-use position by an urging member.

The lens barrel is rotated about the optical axis by a motor.

The camera according to the present invention may further comprise a second lever which moves in linkage with the movement of the lens barrel and which moves the first lever, which is coupled with the second lever.

According to another aspect of the present invention, a camera comprises a flash device movable between a withdrawn position in which the flash device is received in a camera body and an in-use position; a lever member for changing an illumination angle of the flash device; a lens barrel which is movable for magnification variation, the flash device moving from the withdrawn position to the in-use position in linkage with movement of the lens barrel; and a driving member for operating the lever member while the flash device moves from the withdrawn position to the in-use position.

The flash device may include a light source and an optical panel. The lever member may change the distance between the light source and the optical panel.

The driving member may operate in linkage with the movement of the lens barrel and drive the lever member, which is coupled with the driving member.

According to the present invention, spaces in the camera can be effectively used compared with a camera including a known flash device, thereby reducing the size of the camera. Operational members coupled with the flash device serve to move the flash device and also to vary the illumination angle, whereby the number of components can be reduced, thereby reducing manufacturing costs of the camera.

Further objects, features and advantages of the present invention will become apparent from the following description of the preferred embodiments with reference to the attached drawings.

DESCRIPTION OF THE PREFERRED EMBODIMENTS

Figure 1:
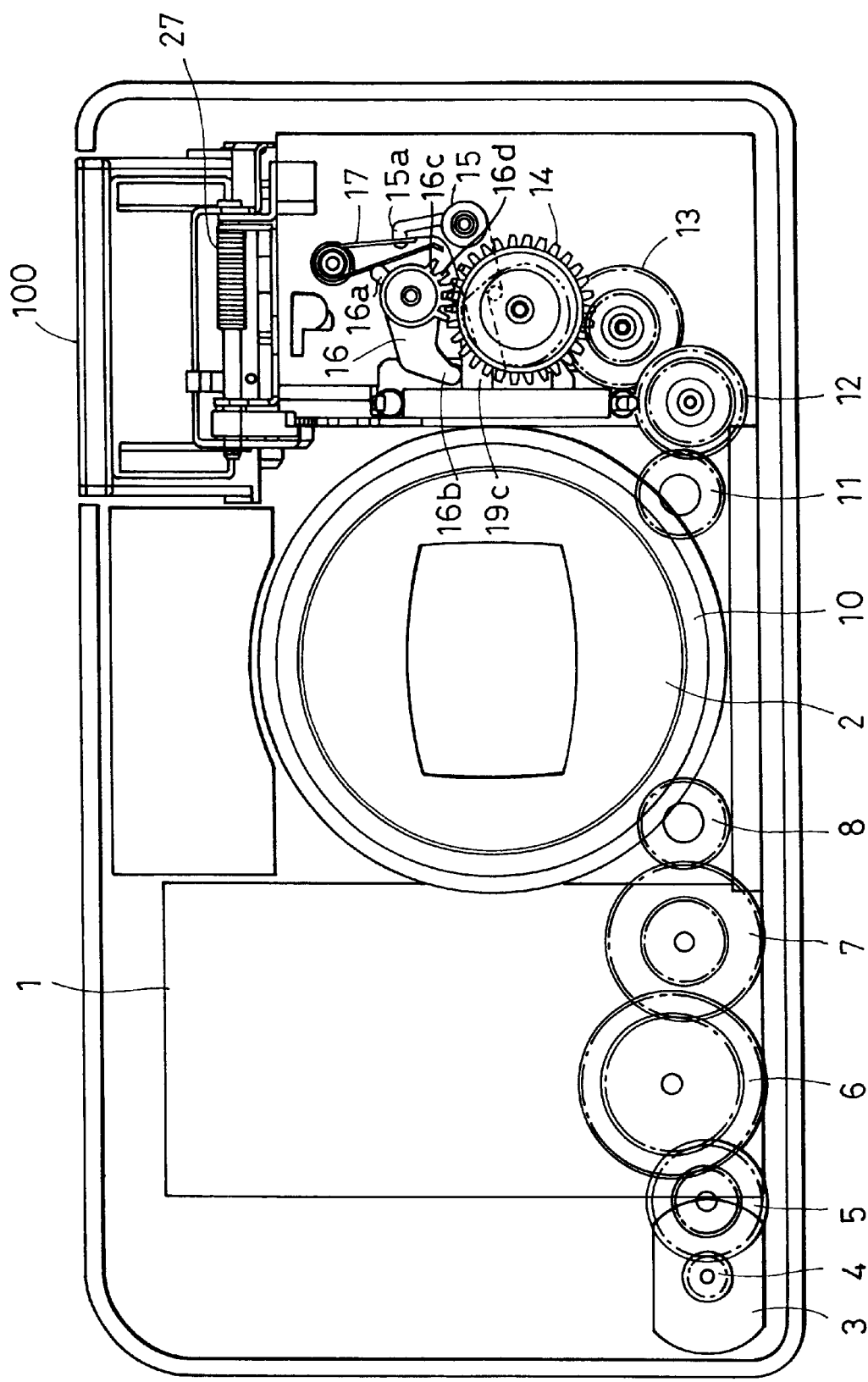
FIG. 1 is a front view of a camera according to an embodiment of the present invention, in which a flash device is withdrawn and a power source is switched off.
Figure 2:
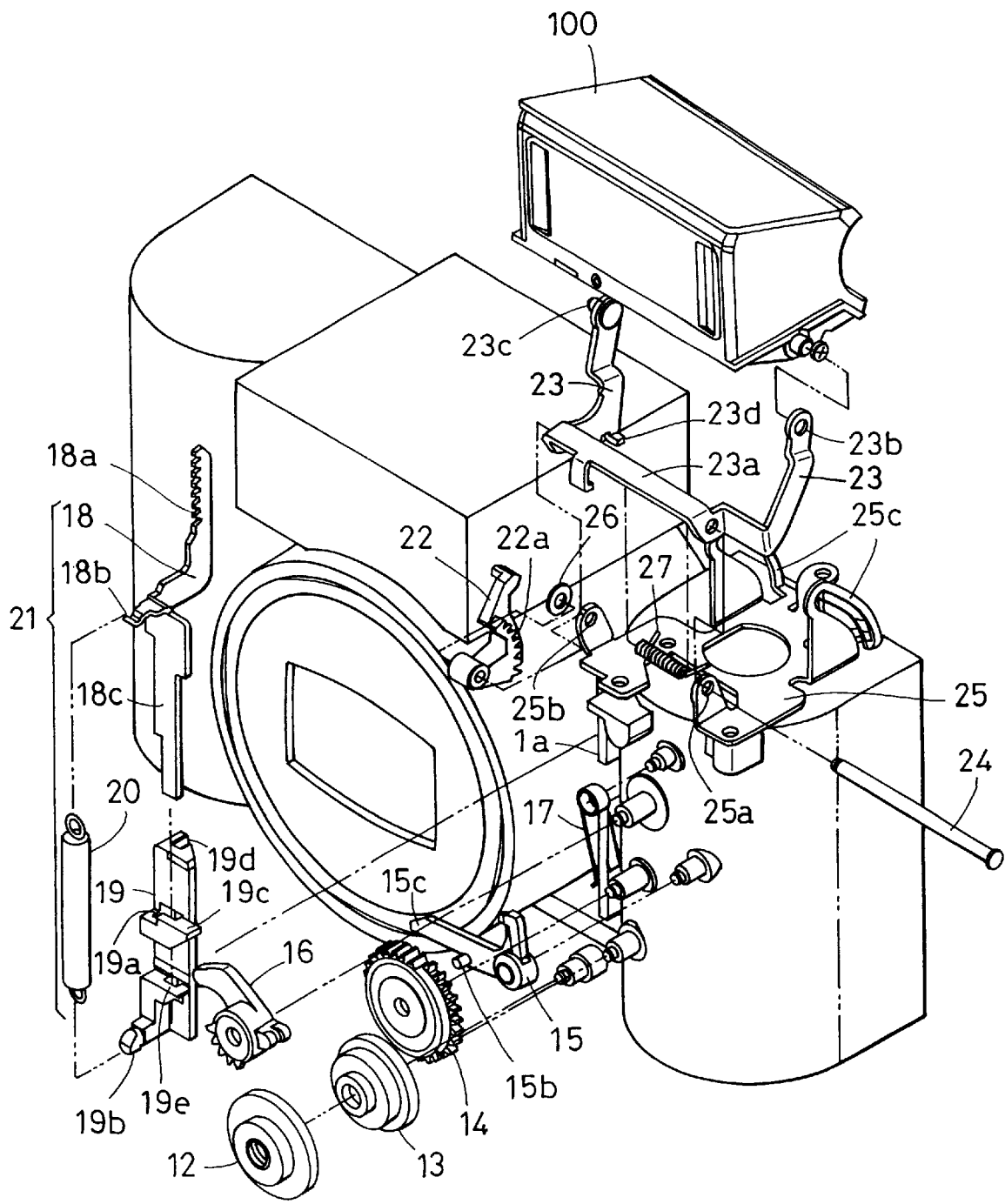
FIG. 2 is an exploded perspective view of the camera shown in FIG. 1.
Figure 3:
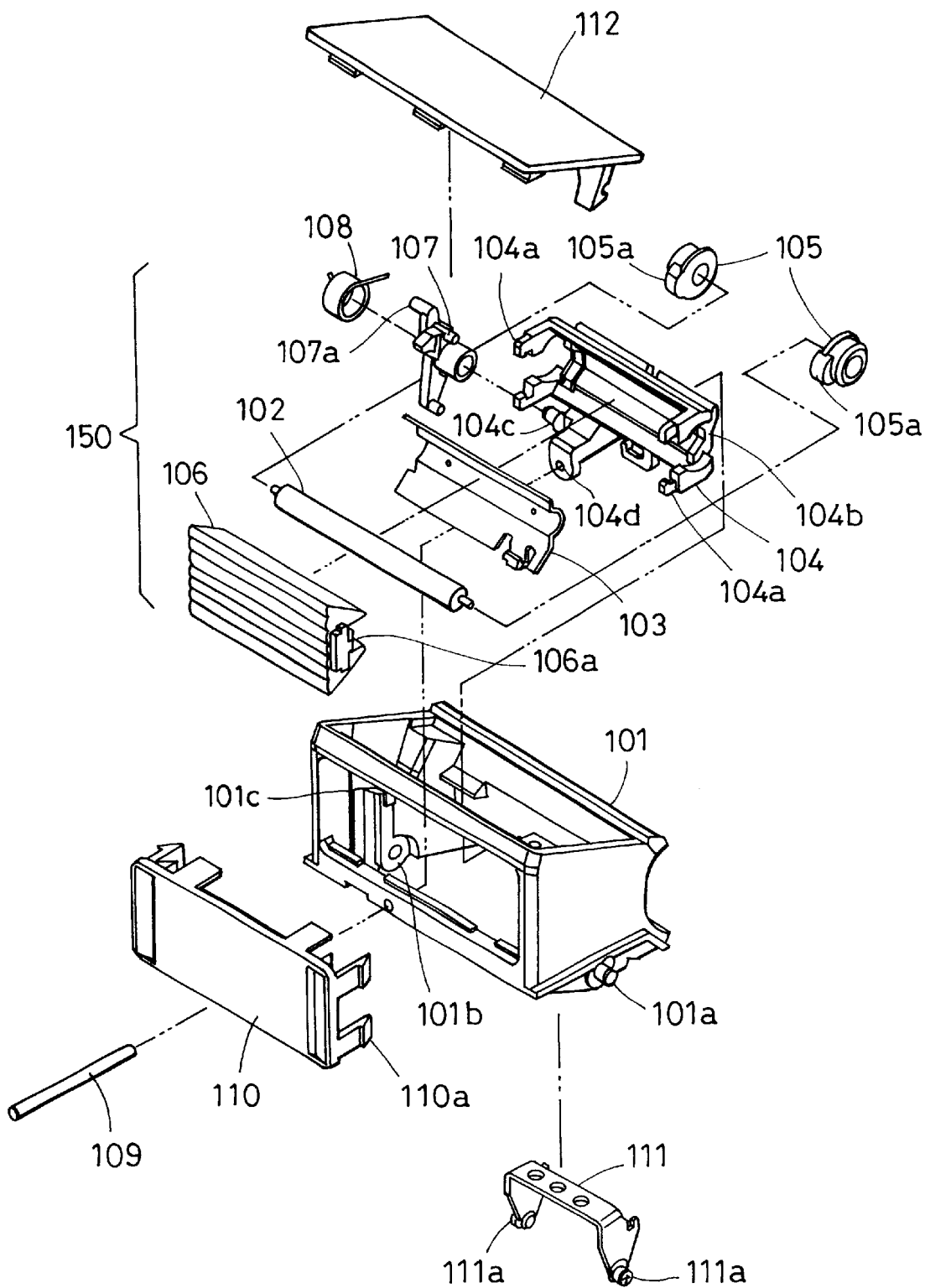
FIG. 3 is an exploded perspective view of a flash device used in the camera shown in FIG. 1.

FIGS. 1 to 4 show an embodiment of the present invention. FIG. 1 is a front view of a camera in which a flash device is withdrawn and a power source is switched off. FIG. 2 is an exploded perspective view of the camera shown in FIG. 1. FIG. 3 is an exploded view of a flash device used in the camera shown in FIG. 1.

FIG. 1 shows a camera body 1, a flash device 100, an imaging-lens barrel 2 collapsible and having a variable magnification, a motor 3, and gears 4, 5, 6, 7, and 8 which are driven by the motor 3. The gears 4 to 8 are each rotatably supported by a shaft connected to the camera body 1 and parallel to the optical axis of the camera's imaging lenses, and transmit a driving power of the motor 3 to a driven ring 10 mounted on the imaging-lens barrel 2.

The driven ring 10 is driven via the gears 4 to 8, and imaging lenses included in the imaging lens barrel 2 are thereby movable along the optical axis. The structure for moving the imaging lenses along the optical axis is formed with a conventional cam groove and cam follower which move in linkage with movement of the driven ring 10 in the rotational direction, whereby the imaging-lens barrel 2, including the imaging lenses, moves back and forth.

The imaging-lens barrel 2 is provided with a position-determining unit for determining focal distance data or the like, and an exposure-control unit, which are connected to a control circuit provided in the camera body 1. Gears 11, 12, 13, and 14 transmit a driving force of the movement of the imaging-lens barrel 2 to the flash device 100. FIG. 1 also shows a zoom-driving lever 15, and a press-down lever 16 for driving the flash device 100 in the withdrawing direction.

Figure 20:
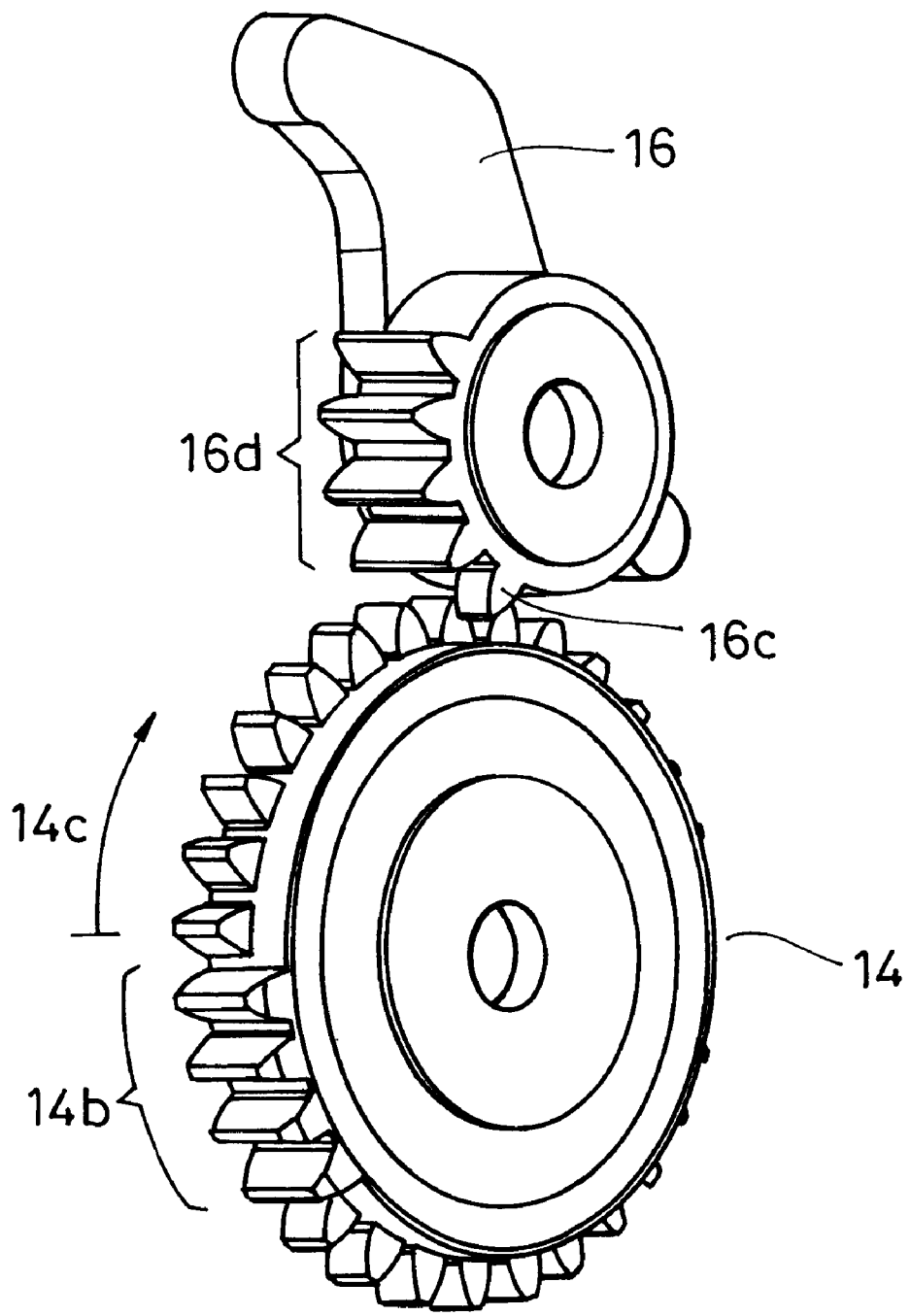
FIG. 20 is a perspective view of the gear 14 and the press-down lever 16, in which the flash device is in the telephoto mode.

The press-down lever 16 is coupled with the gear 14 at one part of the press-down lever 16 via a sector gear 16d thereof (see FIG. 20). A spring 17 mates with an arm 15a of the zoom-driving lever 15 at one end of the spring 17 and with a projection 16a of the press-down lever 16 at the other end of the spring 17. In FIG. 1, the zoom-driving lever 15 is urged clockwise and the press-down lever 16 is urged counterclockwise.

FIG. 2 shows a rack unit 21 which includes a rack plate 18 provided with a rack gear 18a at one portion of the rack plate 18, a slide plate 19, and a spring 20. The rack plate 18 is inserted into a hole 19a of the slide plate 19, the spring 20 is hooked by spring hooks 18b and 19b at the respective ends of the spring 20, and the rack plate 18 and the slide plate 19 are brought into contact with each other at a stepped part 18c and a projection 19c of the rack plate 18 and the slide plate 19, respectively, thereby forming the rack unit 21. The slide plate 19 of the rack unit 21 mates with a guide rib 1a of the camera body 1 at a groove 19d of the slide plate 19, whereby the rack unit 21 is supported so as to vertically slide. FIG. 2 also shows a sector-gear lever 22 and flash-unit-driving arms 23.

One arm of the flash-unit-driving arms 23 is provided with a hole 23b at the end thereof and the other one arm of the flash-unit-driving arms 23 is provided with a shaft 23c caulked at the end thereof. The flash-unit-driving arms 23 are connected to each other via a connecting part 23a so as to form a U-shape. The hole 23b and the shaft 23c mate with a shaft 101a and a hole 101b, respectively, of a flash-unit case 101. The flash-unit case 101 is pivotably connected to the flash-unit-driving arms 23 (see FIG. 3).

The sector-gear lever 22 and the flash-unit-driving arms 23 are pivotably supported by a base 25, which is fixed to the camera body 1, at supporting parts 25a and 25b of the base 25 via a shaft 24. The shaft 24 is prevented from removing by a retaining ring 26 which is coupled with the shaft 24 at an end thereof. The sector-gear lever 22 is mounted with a sector gear 22a thereof engaged with the rack gear 18a of the rack plate 18.

A lift-up spring 27 is mounted on the shaft 24 together with the flash-unit-driving arms 23. The lift-up spring 27 is fixed to the camera body 1 at one end thereof and is applied to the connecting part 23a of the flash-unit-driving arms 23 at the other end of the lift-up spring 27, thereby counterclockwise resiliently urging the flash-unit-driving arms 23 shown in FIG. 2.

A bent part 23d of one arm of the flash-unit-driving arms 23 mates with the sector-gear lever 22 at the lower edge of the sector-gear lever 22; therefore, the sector-gear lever 22 is also urged counterclockwise. The rack unit 21 is also urged upward because the sector gear 22a of the sector-gear lever 22 and the rack gear 18a of the rack unit 21 are engaged with each other. Therefore, when the rack unit 21 is pressed downward, the flash-unit-driving arms 23 pivot clockwise, whereby the flash device 100 is driven in the withdrawing direction. When the rack unit 21 moves upward, the flash-unit-driving arms 23 pivot counterclockwise by being urged by the lift-up spring 27, whereby the flash device 100 moves in the protruding direction.

The flash device 100 is described below with reference to FIG. 3.

In FIG. 3, the flash-unit case 101 contains a light generation unit 150 which includes an electric discharge tube 102, a reflector 103, and a holder 104. The holder 104 holds the electric discharge tube 102, the reflector 103, and a prism 106 in the flash-unit case 101. The reflector 103 and the electric discharge tube 102 are mounted to the holder 104 from the front thereof, the electric discharge tube 102 being provided with rubber bushings 105 individually mounted to right and left terminals of the electric discharge tube 102 from the right and left sides, respectively, of the holder 104.

The prism 106 is mounted to the holder 104 so as to cover the electric discharge tube 102 and to be affixed by hooks 104a of the holder 104. The electric discharge tube 102 and the reflector 103 in contact with each other are pressed to the holder 104 with projections of the rubber bushings 105 being pressed to be deformed by projections 106a of the prism 106. The electric discharge tube 102 and the reflector 103 are stably brought into contact with the holder 104 at a concave part 104b thereof and are stably positioned in the back-and-forth and vertical directions by virtue of a resilient deformation of the rubber bushings 105.

The prism 106 is an optical prism which condenses and applies the flash of the electric discharge tube 102 to a subject by using reflection and refraction in the prism 106.

A zoom lever 107 shown in FIG. 3 is pivotably supported by a shaft 104c of the holder 104. A spring 108 is mounted between the holder 104 and the zoom lever 107 and urges the zoom lever 107 in a clockwise direction.

The light generation unit 150 formed as described above is supported by a bar 109 and is movable back and forth with respect to the flash-unit case 101. The zoom lever 107 is mounted in such a manner that a shaft 107a of the zoom lever 107 mates with a guide groove 101c of the flash-unit case 101. The zoom lever 107 is urged in the clockwise pivoting direction by the spring 108 while the back-and-forth movement of the shaft 107a of the zoom lever 107 is restricted by the guide groove 10c; therefore, the light generation unit 150 is resiliently urged to the lower left of the bar 109 in FIG. 3 or toward the front of the camera. Thus, the light generation unit 150 is supported by the flash-unit case 101.

An optical system is used in the flash device when used in the camera according to the embodiment of the present invention; the optical system of the flash device assumes a light-condensing state when the light generation unit 150 is disposed toward the front of the camera, and assumes a light-diffusing state when the light generation unit 150 is disposed toward the back of the camera. The light generation unit 150 is urged toward the light-condensing side.

A flash window 110 is mounted to the flash-unit case 101 from the front thereof and is supported by the flash-unit case 101 with hooks 110a provided at the vertical sides of the flash window 110 mating with the flash-unit case 101.

A U-shaped guide plate 111 is provided with guide pins 111a at the ends thereof, and the guide plate 111 is screwed onto the bottom of the flash-unit case 101.

A top cover 112 is mounted so as to cover an upper opening of the flash-unit case 101.

The thus formed flash device 100 connected to the flash-unit-driving arms 23, as described above, is mounted to the camera body 1 in such a manner that the guide pins 111a slidingly mate with respective guide grooves 25c provided in the base 25. Therefore, the flash device 100 advances and withdraws when driven by the pivoting motion of the flash-unit-driving arms 23, using a guide structure formed with the guide pins 111a and the guide grooves 25c.

Figure 5:
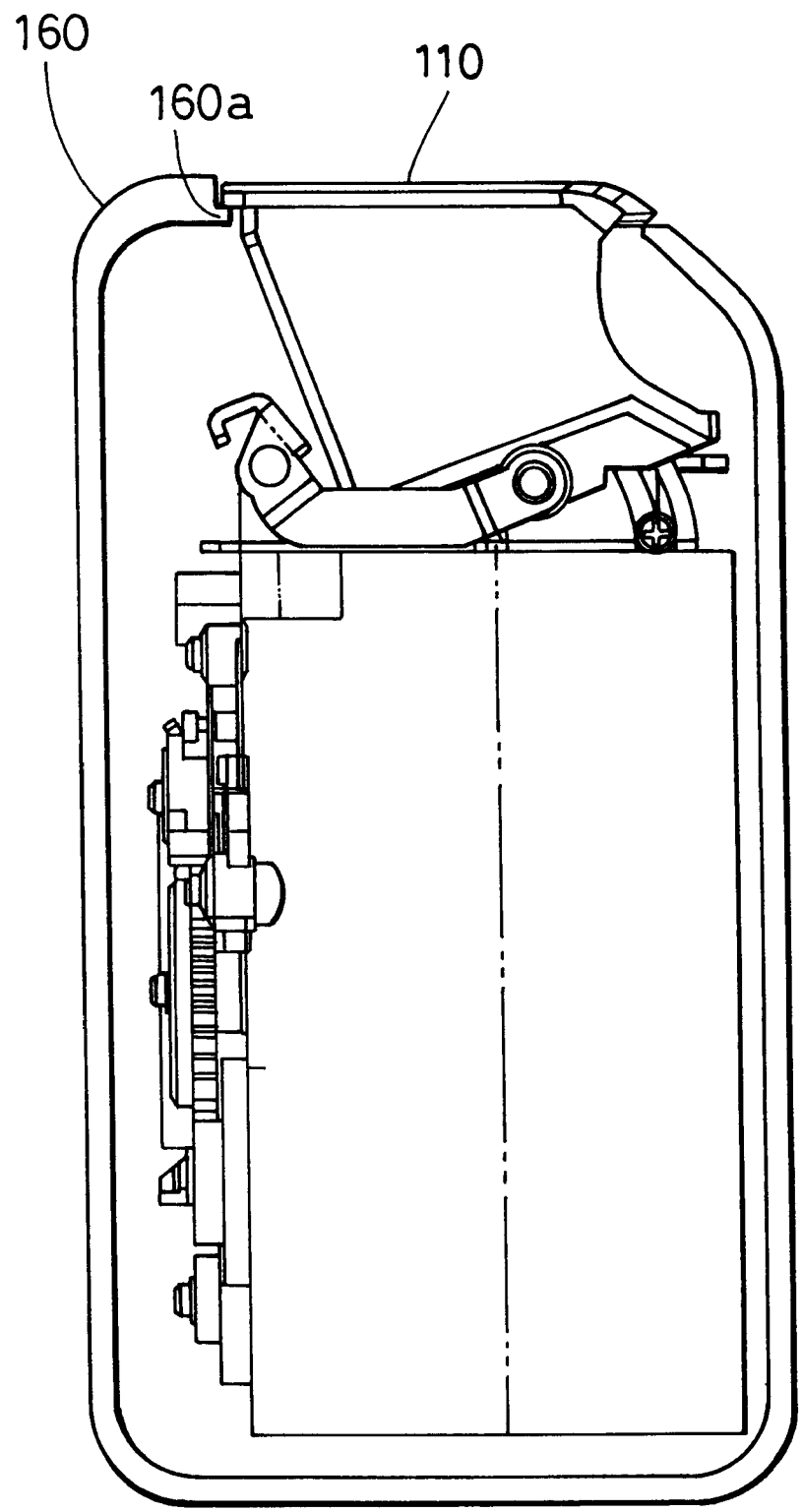
FIG. 5 is a right side view of the camera, with the flash device in a withdrawn state.

When the power of the camera is switched off, the imaging-lens barrel 2 is in a collapsed state, as shown in FIG. 1. In this case, the top cover 112 is in contact with a stepped part 160a of a cover 160 at an end of the top cover 112, thereby restricting further downward motion of the top cover 112 (see FIG. 5). An end 16b of the press-down lever 16 downwardly presses the slide plate 19 at the projection 19c thereof so that the projection 19c separates from the stepped part 18c of the rack plate 18, whereby the spring 20 is charged and downwardly urges the rack plate 18.

The flash device 100 is stably pressed to the withdrawn position by the spring 20. The zoom-driving lever 15 is positioned such that an end 15c of the zoom-driving lever 15 is pressed down by the projection 19c of the slide plate 19.

In this case, when the flash device 100 is forcibly pulled in the protruding direction by a hand or the like, only the rack plate 18 is moved upward while charging the spring 20 via the flash-unit-driving arms 23 and the sector-gear lever 22. When releasing the flash device 100, it is restored to the withdrawn position by the spring 20.

The principle of illumination-angle-variations is described below with reference to FIG. 4.

Figure 4A:
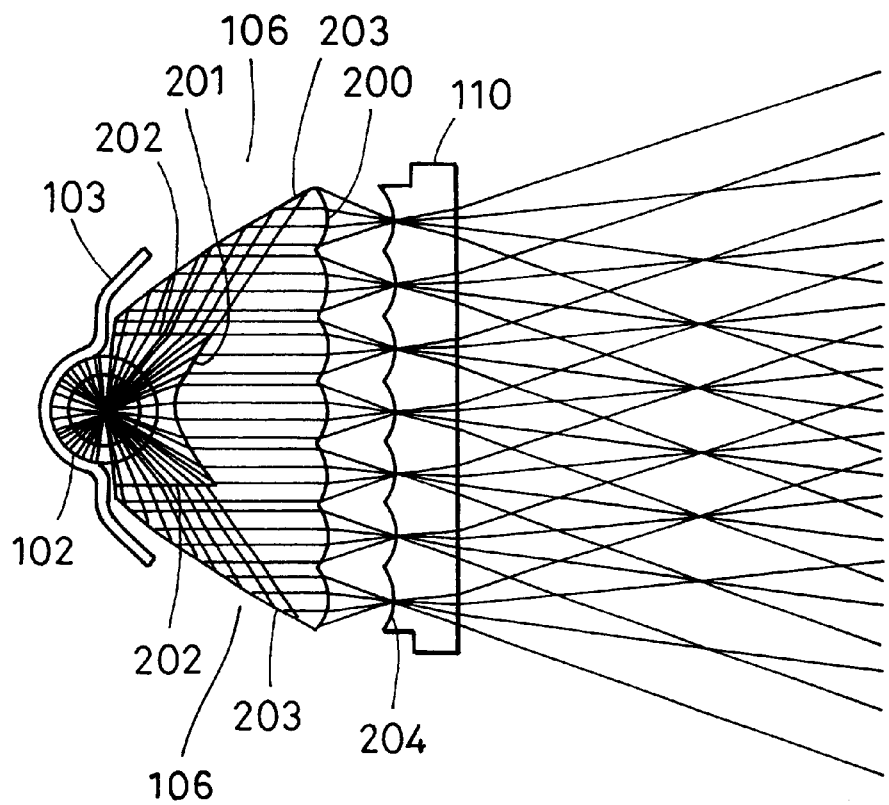
FIGS. 4A and 4B are illustrations showing a variation in the illumination angle of the flash device used in the camera according to the embodiment of the present invention.
Figure 4B:
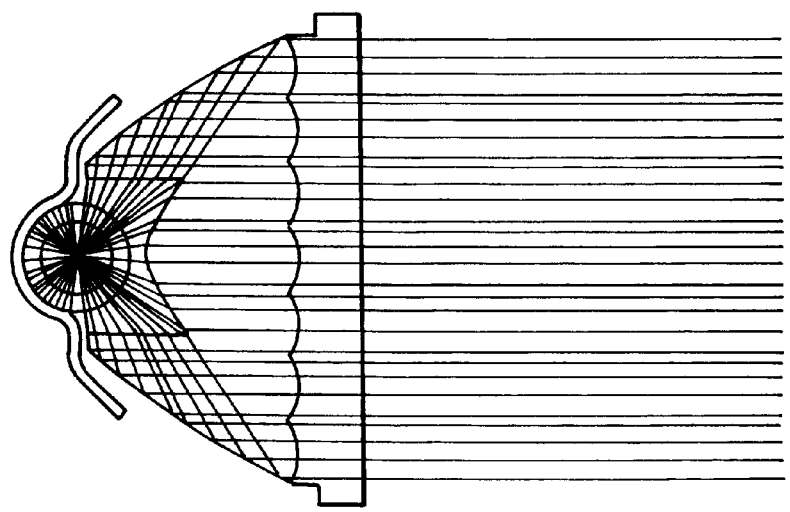

FIG. 4A is a sectional view perpendicular to the axis of the electric discharge tube 102, which shows a light-diffusing state. FIG. 4B is a sectional view perpendicular to the axis of the electric discharge tube 102, which shows a light-condensing state. The prism 106 includes a front surface formed with a plurality of cylindrical lenses 200, a rear part including a convex cylindrical lens 201 which opposes the electric discharge tube 102 and flat surfaces 202 which oppose each other with the convex lens 201 and the electric discharge tube 102 therebetween, and upper and lower curved surfaces 203.

The flash window 110 is provided with a flat front face and a rear face which is formed with concave cylindrical lenses 204 each having an inversely shaped face complementary to the convex cylindrical lens 200.

In FIGS. 4A and 4B, a part of light fluxes generated by the electric discharge tube 102 is applied to the convex lens (an incident surface) 201 of the prism 106. The incident surface 201 is not formed with a simple cylindrical surface, but is a curved surface formed optimally so as to minimize the effect of aberration in order to produce substantially collimated fluxes of the incident light which has been emitted toward the front from the center of the electric discharge tube 102.

The flat surfaces (incident surfaces) 202 refract the light fluxes emitted upward and downward and in oblique directions from the center of the electric discharge tube 102 and apply the light fluxes to the upper and lower curved surfaces (reflecting surfaces) 203. The curved surfaces 203 are formed so as to perform total internal reflection of the light fluxes incident through the flat surfaces 202 and to substantially collimate the light fluxes to be applied to a subject through the prism 106. The reflector 103 is formed in a cylinder coaxial with the electric discharge tube 102. Therefore, light fluxes emitted by the electric discharge tube 102 in a rearward derection are reflected by the reflector 103, pass through the inside of the electric discharge tube 102, are applied to the incident surfaces 201 and 202, and pass through substantially the same paths as those of the above-described light fluxes which are applied directly to the incident surfaces 201 and 202.

Light beams which have been collimated as described above are focused by the convex cylindrical lenses 200 disposed at the front, where the focused light beams are formed in lines by each cylindrical lens 200. The surface of each cylindrical lens 200 is not formed with a simple cylindrical surface, but is a curved surface formed optimally so as to minimize the effect of aberration. Since the convex cylindrical lenses 200 are formed in the same shape as each other, the light beams are focused in space at substantially the same distance from the surface of each cylindrical lens 200, and are applied to the concave cylindrical lenses 204 of the flash window 110.

In the diffusing state shown in FIG. 4A, the position of the prism 106 is set so that the convex cylindrical lenses 200 focus the light beams in the vicinity of the vertices of the concave cylindrical lenses 204; therefore, the light beams after focusing are transmitted through the flash window 110 in a diffused state substantially without refraction and are applied to a subject at a wide illumination angle.

In the condensing state shown in FIG. 4B, the prism 106 is substantially in contact with the flash window 110. In this state, the light fluxes emitted by the convex cylindrical lenses 200 are applied to substantially the same positions on the incident surfaces of the concave cylindrical lenses 204 as those on the emission surfaces of the convex cylindrical lenses 200. Therefore, the incident light fluxes are refracted in the inversely refracted direction by substantially the same angle of refraction of the convex cylindrical lenses 200. Thus, the same effect as that which is obtained when the convex cylindrical lenses 200 and the concave cylindrical lenses 204 are not used is obtained, whereby the light beams are applied to a subject in such a manner that the light distribution angle, which is controlled in the optical prism 106, is maintained at a significantly small value.

When the prism 106 is disposed in an intermediate position between the diffusing state shown in FIG. 4A and the condensing state shown in FIG. 4B, the incident light beams are refracted according to the positions on the incident surfaces of the concave cylindrical lenses 204, whereby an intermediately condensed state can be obtained.

By using such an optical system in which the light fluxes from the electric discharge tube 102 are collimated in the prism 106 and the distance between the convex cylindrical lenses 200 and the concave cylindrical lenses 204 is changed, a flash device, in which the amount of movement of a light generation unit is small and of which variation rate between condensation and diffusion of light fluxes is large, is obtainable.

The operation of advancement and withdrawal of the flash device and zooming of the camera described above are described below.

When switching on the camera shown in FIG. 1 which previously is in the off-state, a camera-control circuit drives the motor 3 in the direction for advancing the lens barrel 2. The power of the motor 3 is transmitted to the driven ring 10 via the reduction gears 4 to 9. By driving the driven ring 10, the imaging-lens barrel 2 moves from a collapsed position to a position (wide-angle position) in which photographing is possible.

When the driven ring 10 is driven, the flash-unit-driving gears 11, 12, 13, and 14 which engage with the driven ring 10 also rotate, and the press-down lever 16 shown in FIG. 1 pivots clockwise. When the press-down lever 16 pivots clockwise, the flash-unit-driving arms 23, the sector-gear lever 22, and the rack unit 21 move in the protruding direction by being urged by the lift-up spring 27. With this operation, the flash device 100 is driven to move upwardly by the pivoting motion of the flash-unit-driving arms 23 and the guide structure formed with the guide pins 111a and the guide grooves 25c.

Figure 8:
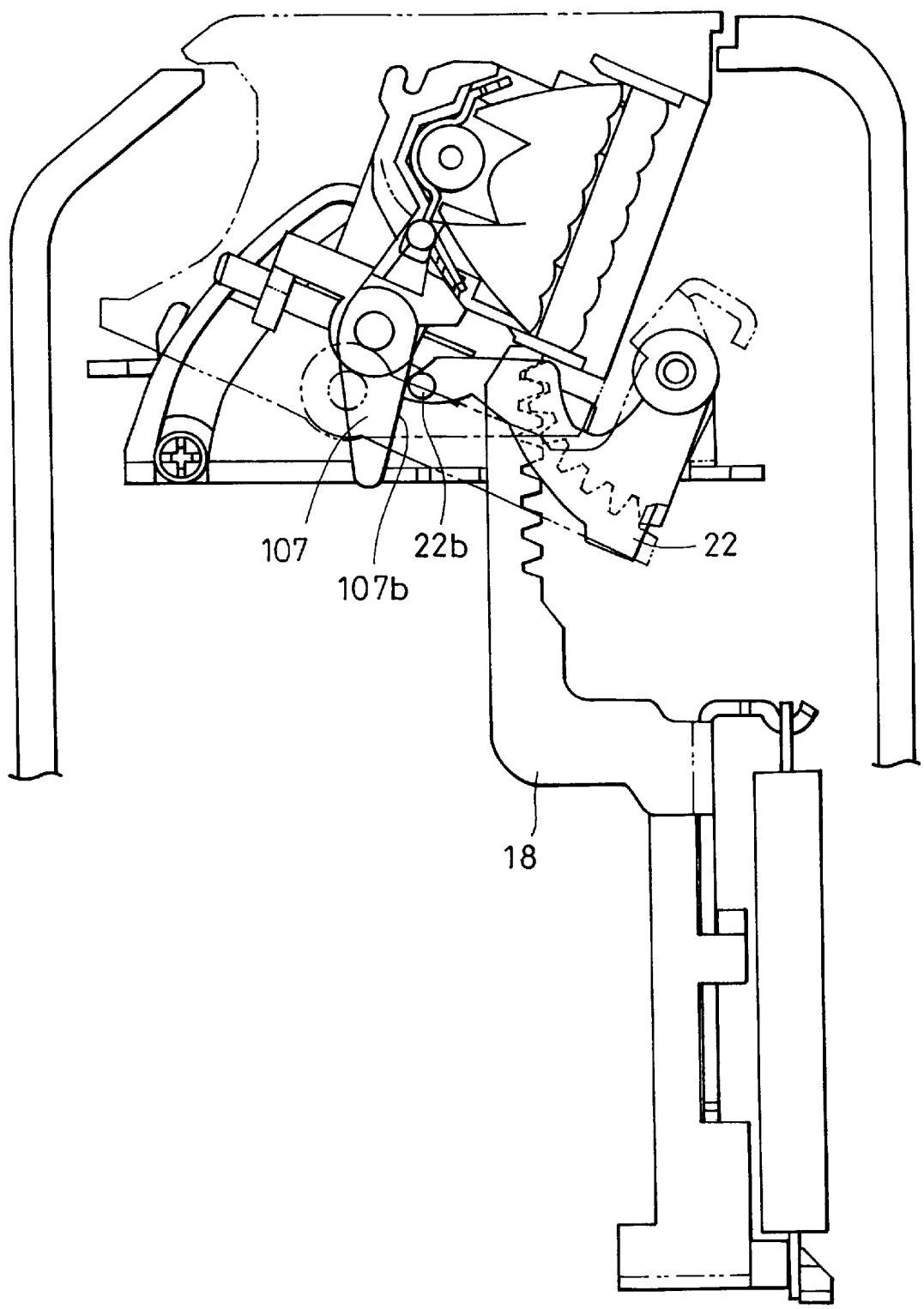
FIG. 8 is an illustration of linkage components of the camera, with the flash device in a withdrawn position.
Figure 9:
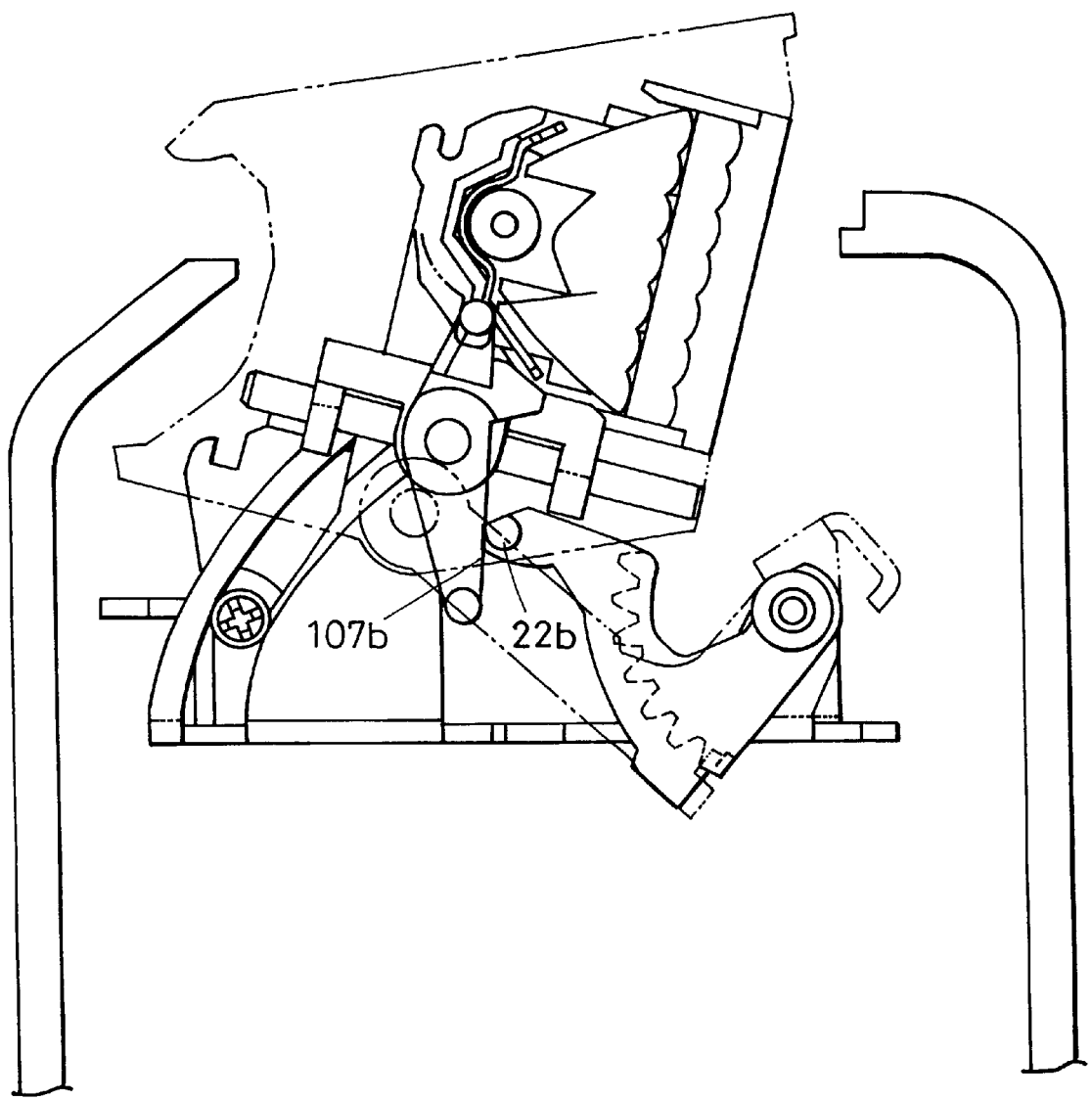
FIG. 9 is an illustration of the linkage components of the camera, with the flash device in an intermediate position between the withdrawn and protruded positions.
Figure 10:
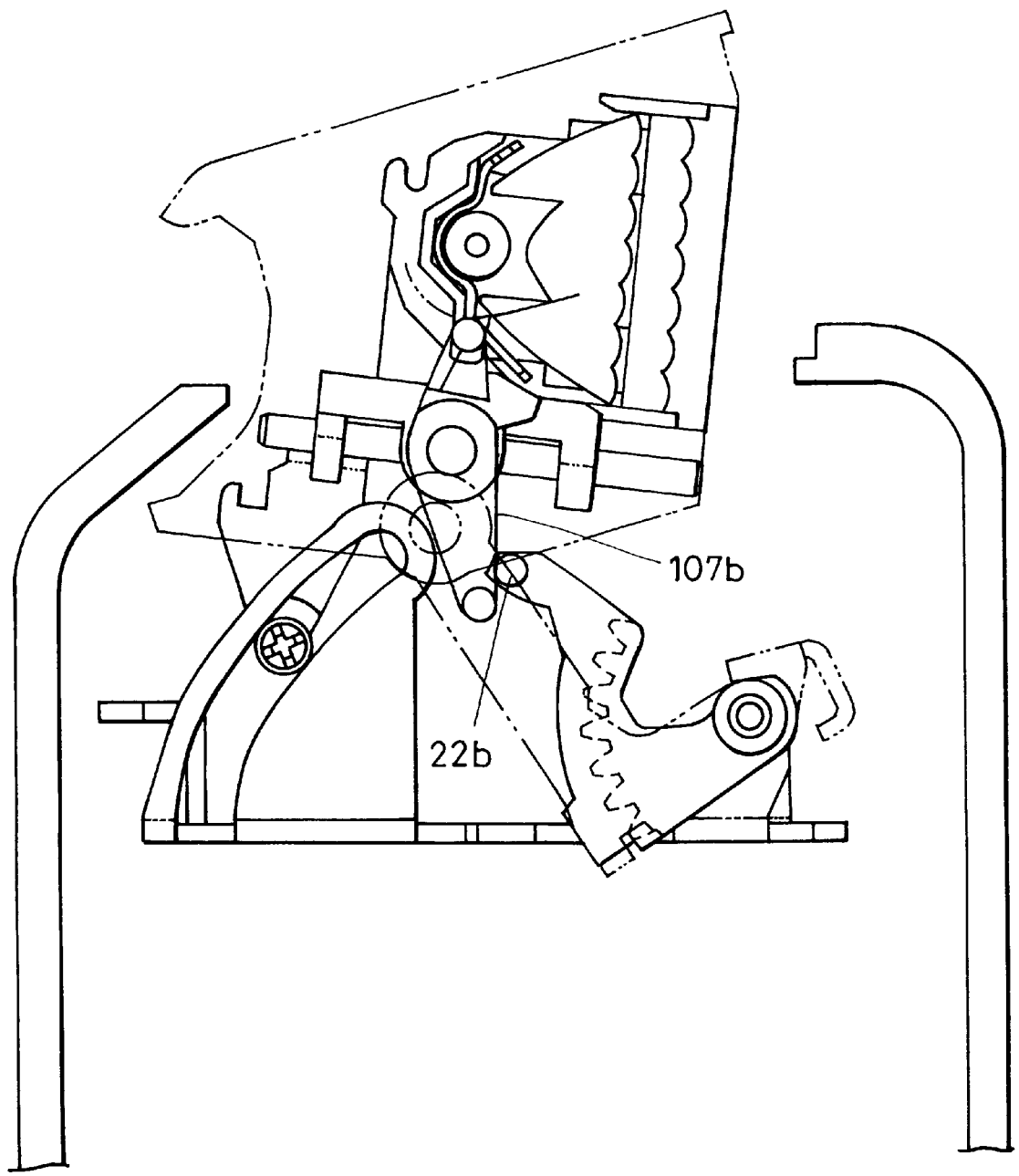
FIG. 10 is an illustration of the linkage components, in which the flash device is in the intermediate position between the withdrawn and protruded positions.
Figure 11:
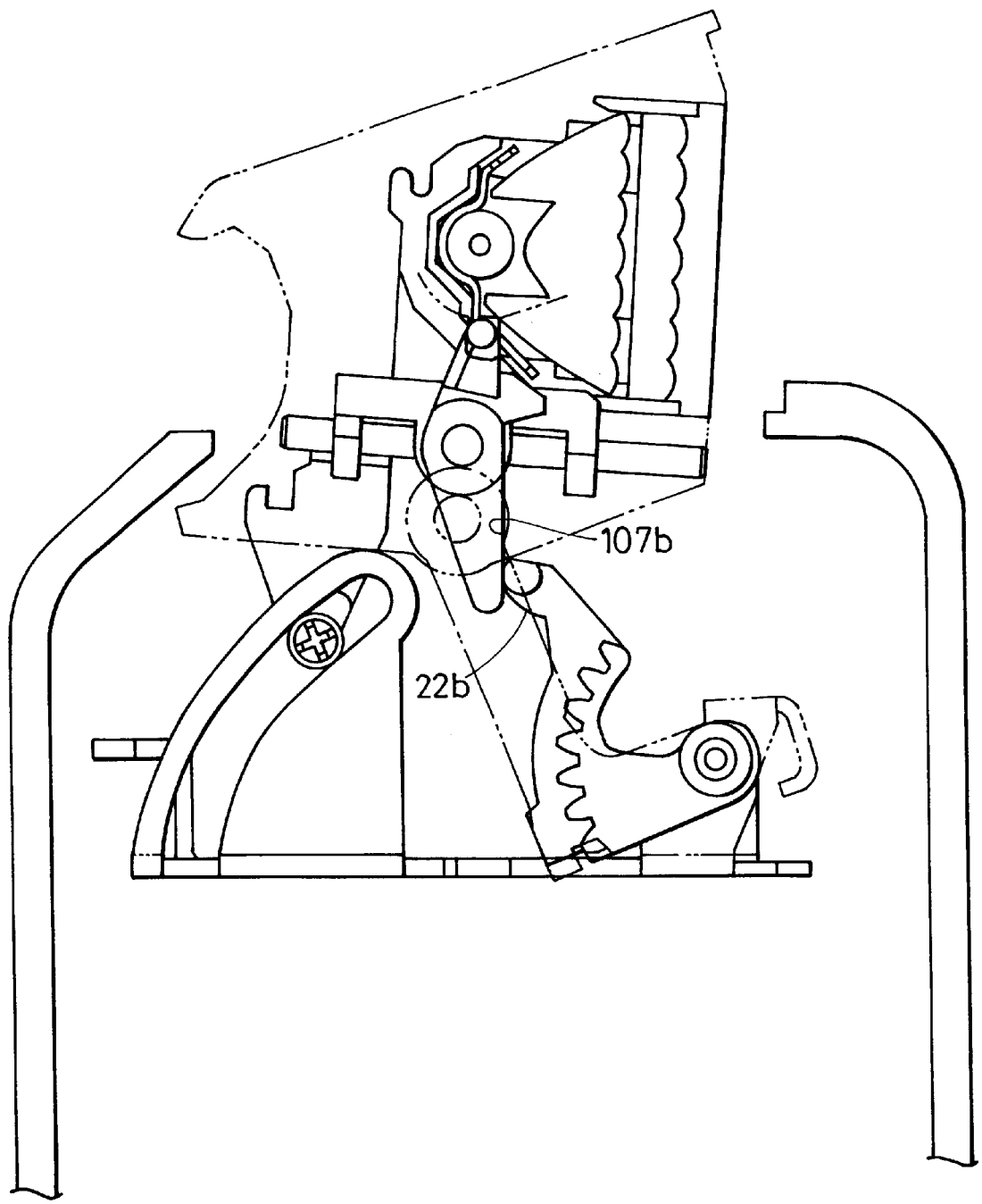
FIG. 11 is an illustration of the linkage components, in which the flash device is in the protruded position.
Figure 12:
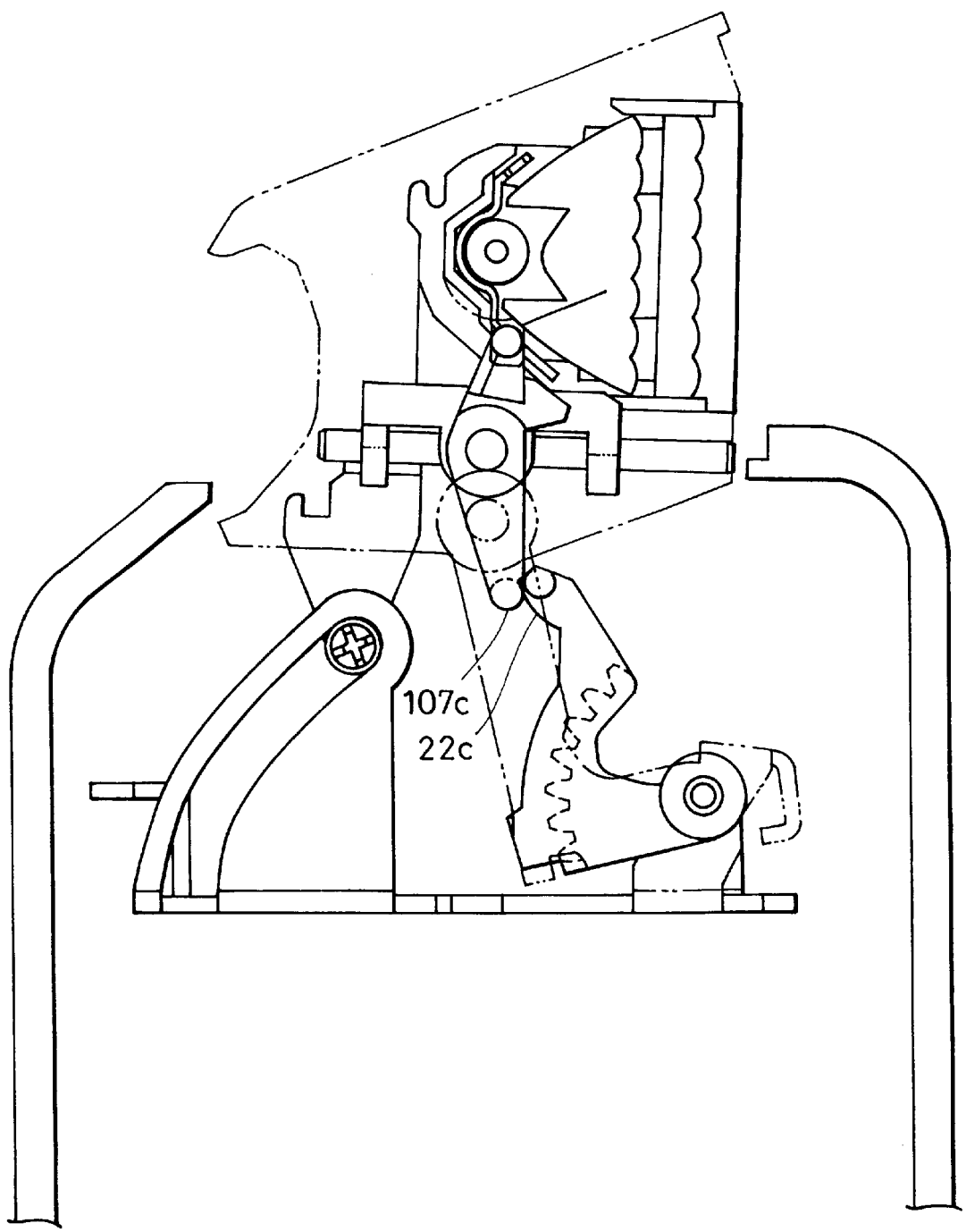
FIG. 12 is a left side view of the linkage components, in which the flash device is in the protruded position in a wide-angle mode.

FIGS. 8 to 12 show the operation described above. FIG. 8 shows the flash device 100 in a withdrawn state. FIG. 12 shows the flash device 100 in an advanced state when the imaging-lens barrel 2 is in a wide-angle position. FIGS. 9 to 11 show the flash device 100 in each step of movement to the protruded position.

When the flash device 100 is in the withdrawn position shown in FIG. 8, a shaft 22b of the sector-gear lever 22 is in contact with an arm 107b of the zoom lever 107. Therefore, the pivoting motion of the zoom lever 107 in the counterclockwise direction is restricted. In this case, since the movement of the light generation unit 150 toward the front is restricted, the light generation unit 150 is disposed substantially in an intermediate position between a light-condensing position and the light-diffusing position.

Therefore, a risk that the light generation unit 150 moves too far to the front and thereby interferes with internal components such as a light-generation circuit board when the flash device 100 is in the withdrawn position is avoided. The light generation unit 150 does not interfere with the base 25, which is positioned toward the rear side.

According to the present embodiment, when the flash device 100 is in the withdrawn position, the light generation unit 150 is disposed substantially in an intermediate position between the light-condensing position and the light-diffusing position, thereby avoiding any interference with the components disposed in front of and behind the light generation unit 150. The light generation unit 150 may be disposed more toward the light-condensing side or more backward from the light-diffusing position by devising in designing the position of the shaft 22b and the shape of the arm 107b, whereby a large space can be obtained either behind or in front of the light generation unit 150, respectively.

The light generation unit 150 disposed in the flash device 100 is driven while the flash device 100 moves from the withdrawn position to the protruded position, and when the flash device 100 reaches the protruded position, the light generation unit 150 has a given illumination angle. The space in the camera can be effectively used because the position of the light generation unit 150 in the withdrawn position can be freely set.

When the flash device 100 shown in FIG. 8 moves in the protruding direction and the sector-gear lever 22 pivots clockwise, the shaft 22b moves sliding on the arm 107b of the zoom lever 107 toward the end of the arm 107b, as shown in FIGS. 9 to 11. In the steps shown in FIGS. 11 and 12 where the flash device 100 is disposed close to the protruded position, the zoom lever 107 and the sector-gear lever 22 come into contact with each other at a shaft 107c and an arm 22c, respectively, of the zoom lever 107 and the sector-gear lever 22, respectively.

During the movement of the flash device 100 in the protruding direction, the light generation unit 150 gradually changes its position in the flash-unit case 101. By gradually driving the light generation unit 150 during the protruding movement, a rapid change of the load applied by the spring 108 is avoided, whereby smooth advancing and withdrawing movements are made possible.

Figure 6:
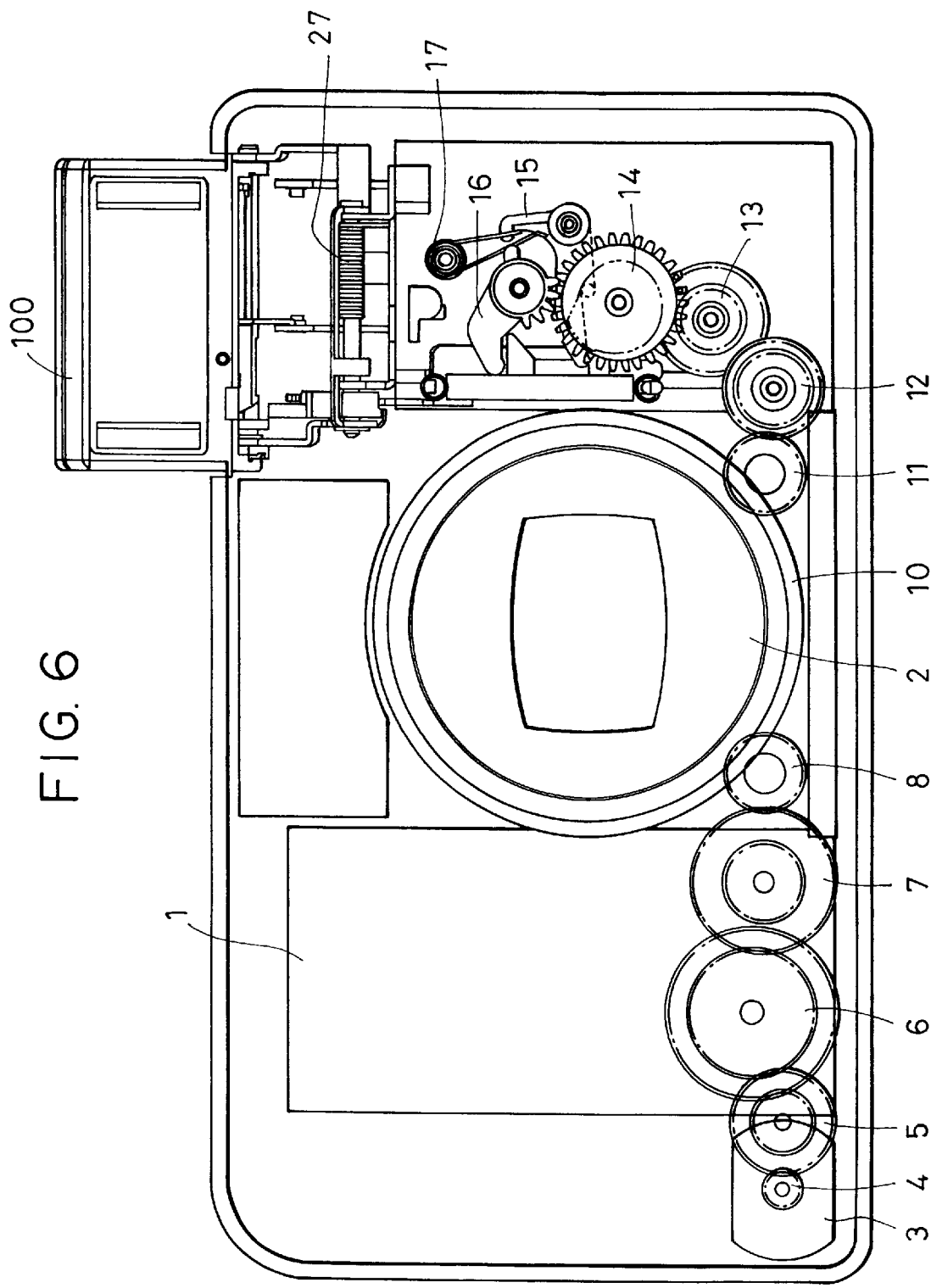
FIG. 6 is a front view of the camera, with the flash device in a protruded state.
Figure 7:
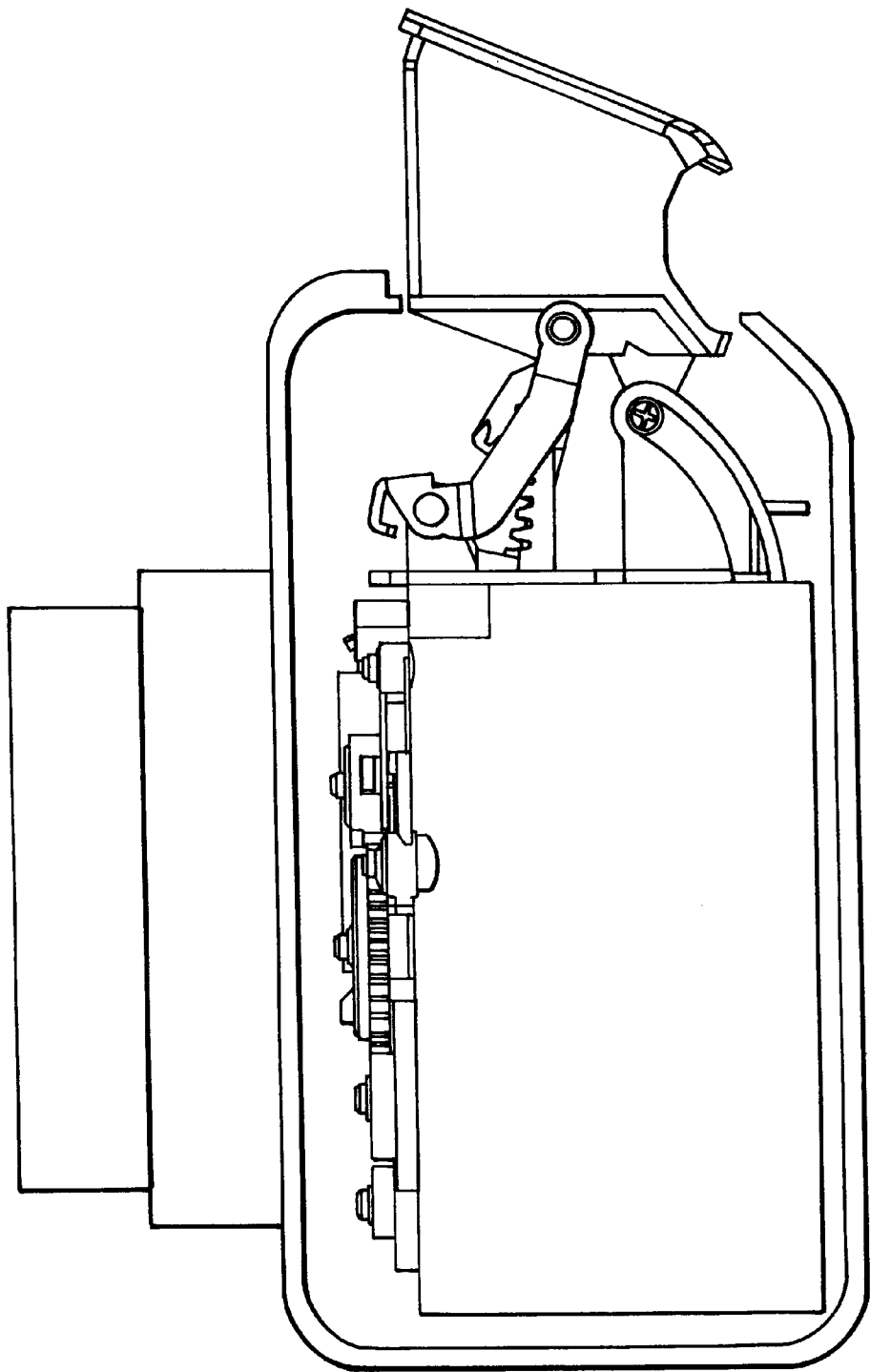
FIG. 7 is a right side view of the camera, with the flash device in the protruded state.

When the imaging-lens barrel 2 moves from a collapsed position to a wide-angle position, the movement is restricted by the guide pins 111 respectively coming into contact with ends of the guide grooves 25c, and the flash device 100 is thereby set in the protruded position, as shown in FIGS. 6 and 7. The press-down lever 16 pivots to a position in which the end 16b of the press-down lever 16 slightly separates from the projection 19c of the slide plate 19, and the flash device 100 is reliably set in the protruded position.

Figure 13:
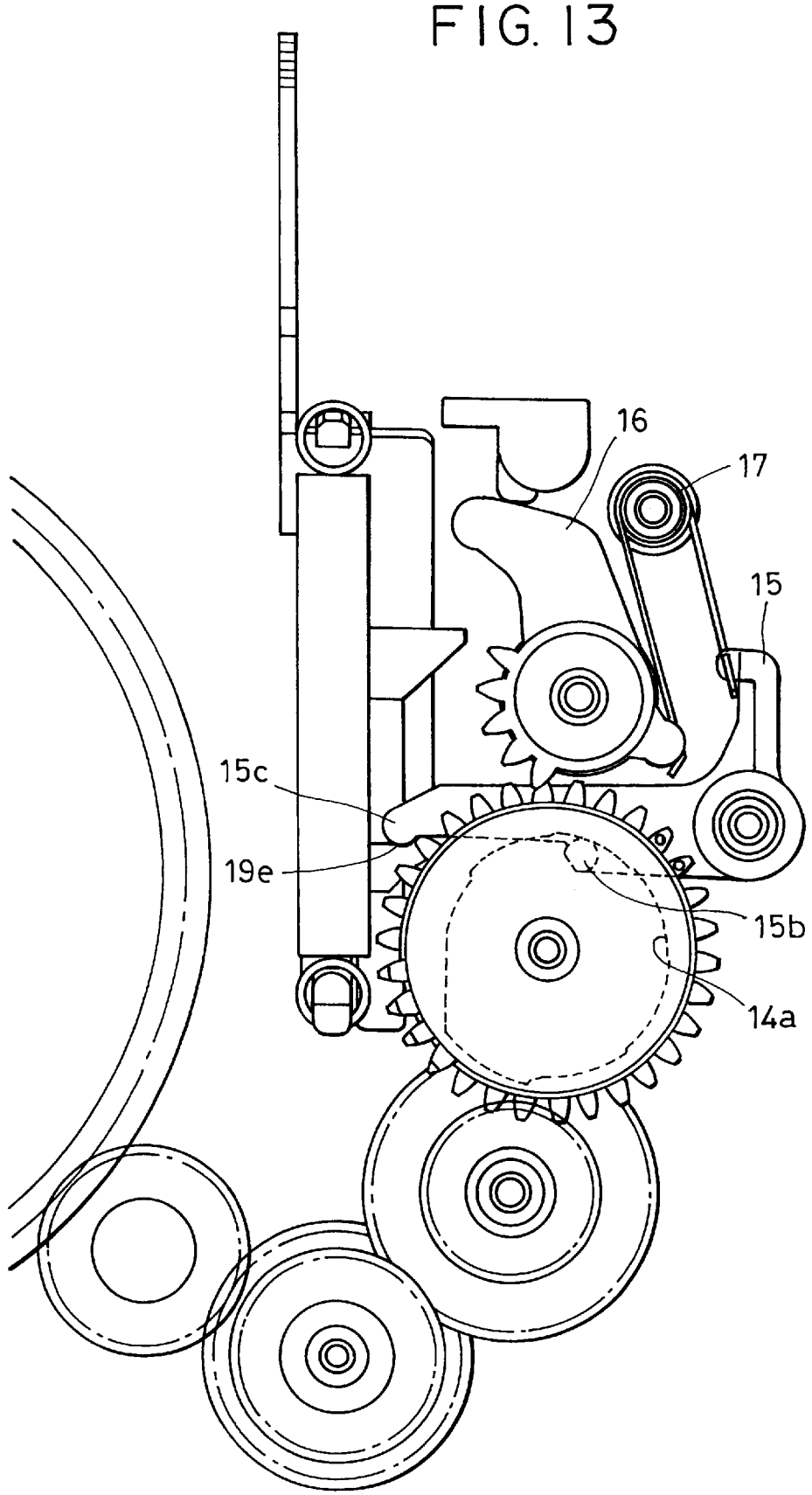
FIG. 13 is a front view of the linkage components, in which the flash device is in the protruded position in the wide-angle mode.

In FIG. 13, when the rack unit 21 moves upwardly, the zoom-driving lever 15 pivots as a result of urging by the spring 17, whereby a shaft 15b of the zoom-driving lever 15 comes into contact with a cam 14a provided at the inner side of the gear 14.

The light generation unit 150 is constantly urged toward the front of the camera which is the light-condensing side. Therefore, the light generation unit 150 urges the sector-gear lever 22 to pivot clockwise and the rack unit 21 coupled with the sector-gear lever 22 to move upward. However, the sector-gear lever 22 does not actually pivot because further upward movement of the rack unit 21 is restricted by a projection 19e of the slide plate 19 of the rack unit 21 coming into contact with the end 15c of the zoom-driving lever 15, whereby movement of the light generation unit 150 toward the front is restricted.

In short, the position of the light generation unit 150 is controlled by the cam 14a and the zoom-driving lever 15.

A zoom operation is described with reference to FIGS. 12 to 17.

FIGS. 12 and 13 show a state in which the imaging-lens barrel 2 is disposed in the wide-angle position. When operating a zoom-operation member so that the imaging-lens barrel 2 moves toward a telephoto mode, the imaging-lens barrel 2 is driven in the extending direction.

A driving power of the motor 3 is transmitted to the driven ring 10 via the reduction gears 4 to 9, whereby the driven ring 10 rotates and the imaging-lens barrel 2 extends so as toward the telephoto mode. When the driven ring 10 rotates, the gears 11, 12, and 13 for driving the flash device also rotate and the gear 14 rotates counterclockwise. When the gear 14 rotates, the shaft 15b traces the cam 14a and the zoom-driving lever 15 clockwise pivots by an amount corresponding to a cam lift of the cam 14a. As described above, the light generation unit 150 is urged toward the light-condensing side which is the telephoto side, and movement of the rack unit 21 is restricted by the zoom-driving lever 15. Therefore, when the zoom-driving lever 15 pivots, the light generation unit 150 moves toward the light-condensing side.

Figure 14:
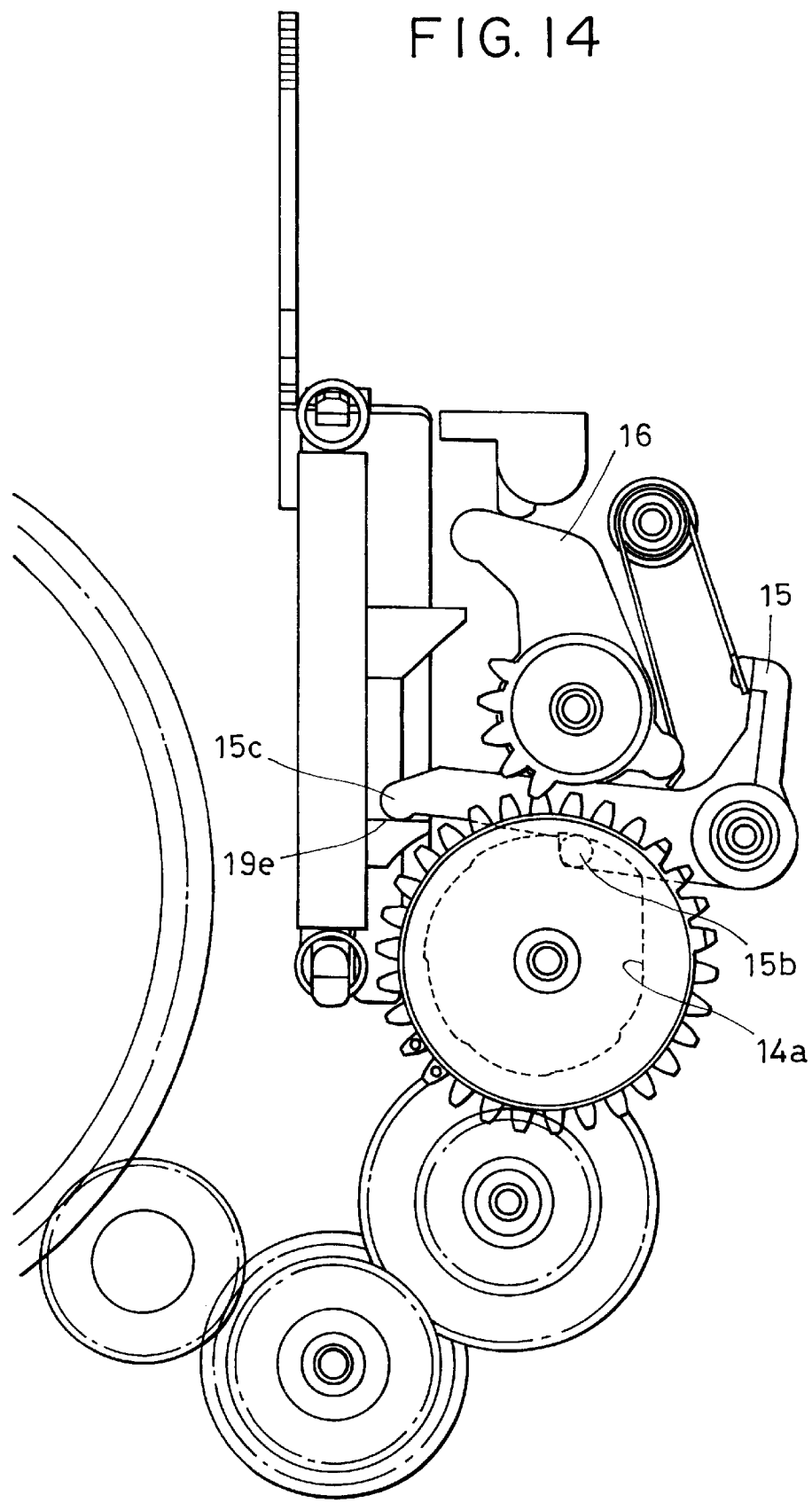
FIG. 14 is a front view of the linkage components, in which the flash device is in the protruded position in an intermediate mode.
Figure 15:
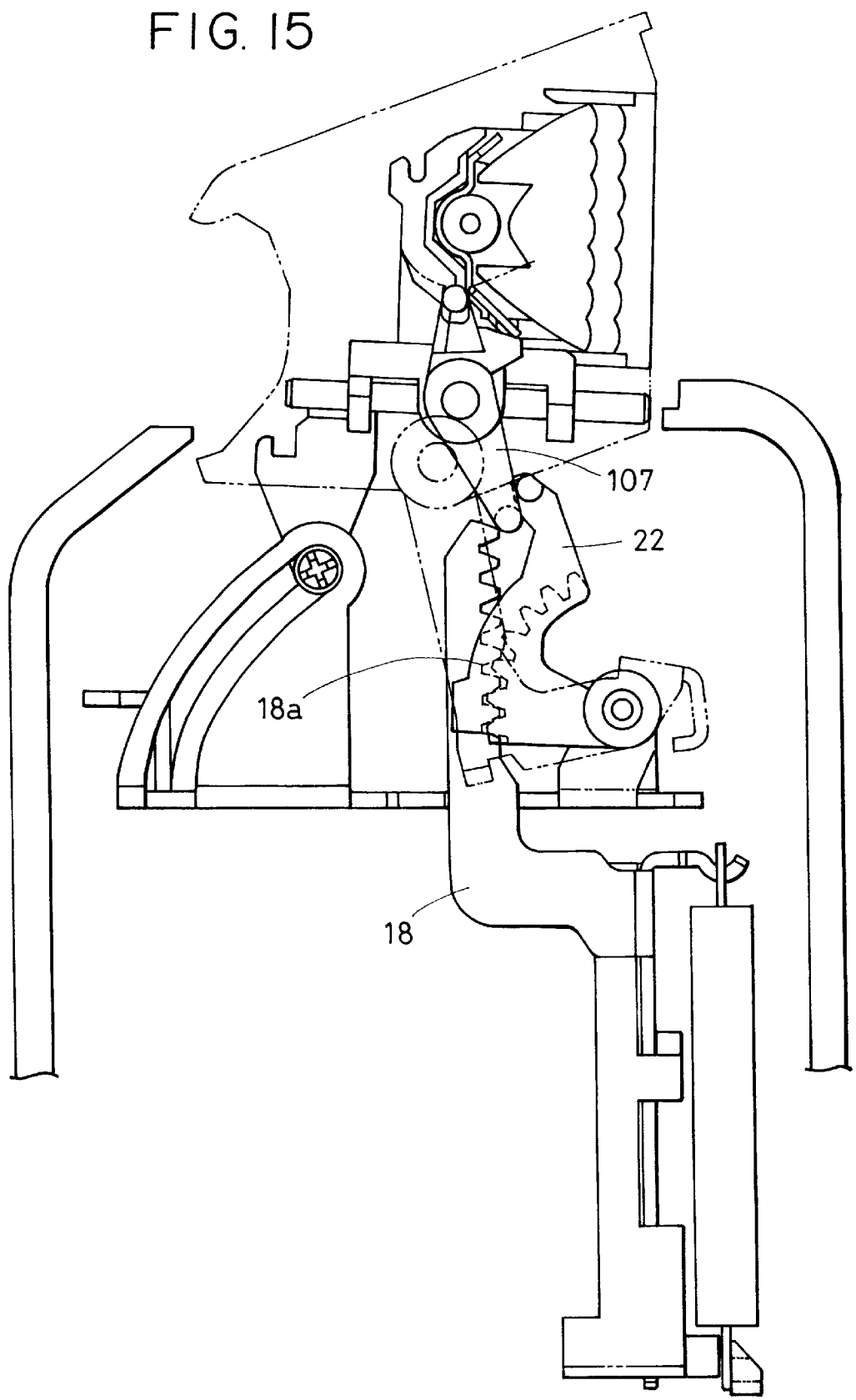
FIG. 15 is a left side view of the linkage components, in which the flash device is in the protruded position in the intermediate mode.

FIGS. 14 and 15 show a state in which the imaging-lens barrel 2 is disposed in an intermediate mode between the wide-angle mode and the telephoto mode. In FIG. 14, when the gear 14 rotates, the shaft 15b traces the cam 14a and the zoom-driving lever 15 pivots, whereby the rack unit 21 moves to a position higher than that shown in FIGS. 12 and 13. The light generation unit 150 moves forward, whereby the distance between the prism 106 and the flash window 110 decreases.

Figure 16:
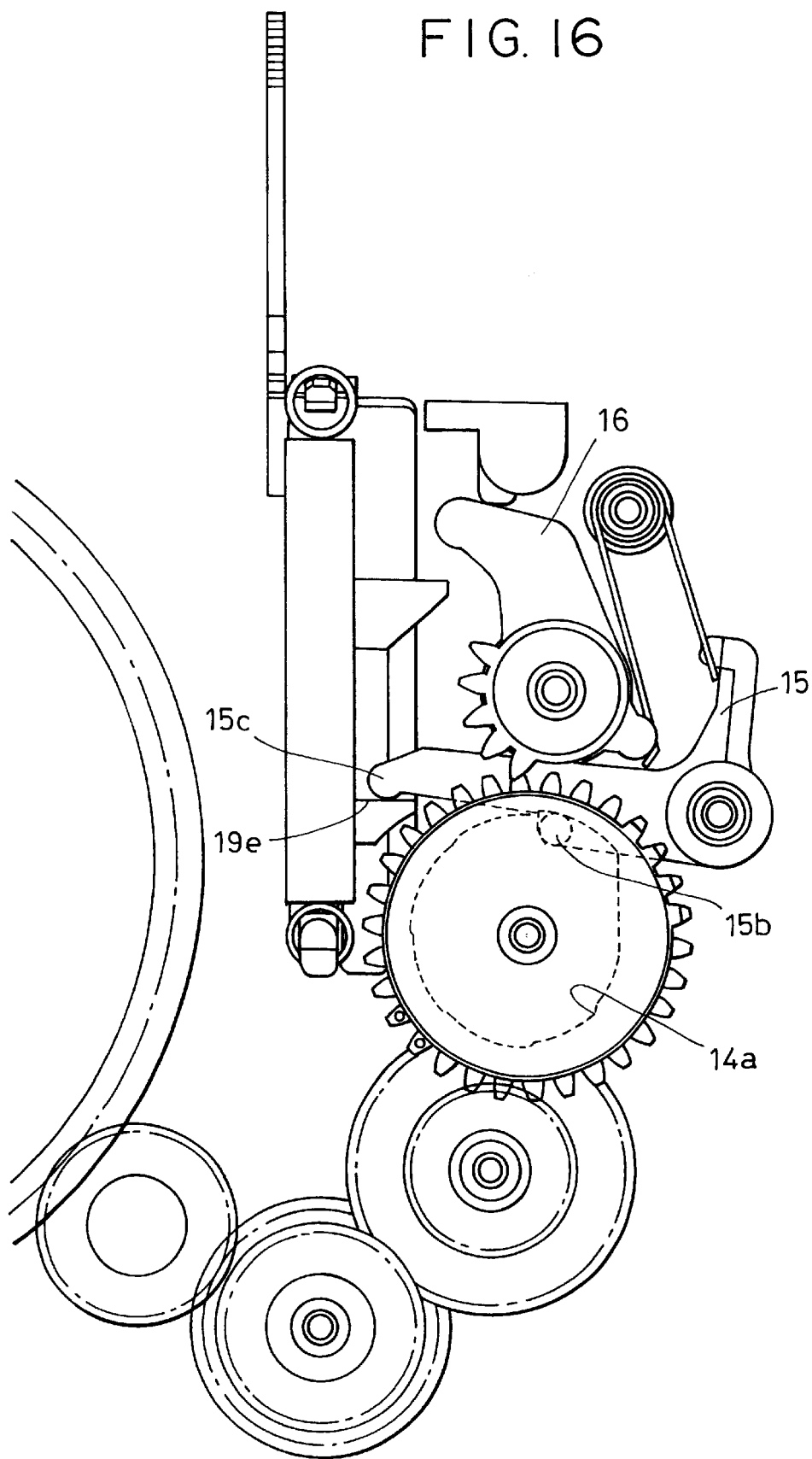
FIG. 16 is a front view of the linkage components, in which the flash device is in the protruded position in a telephoto mode.
Figure 17:
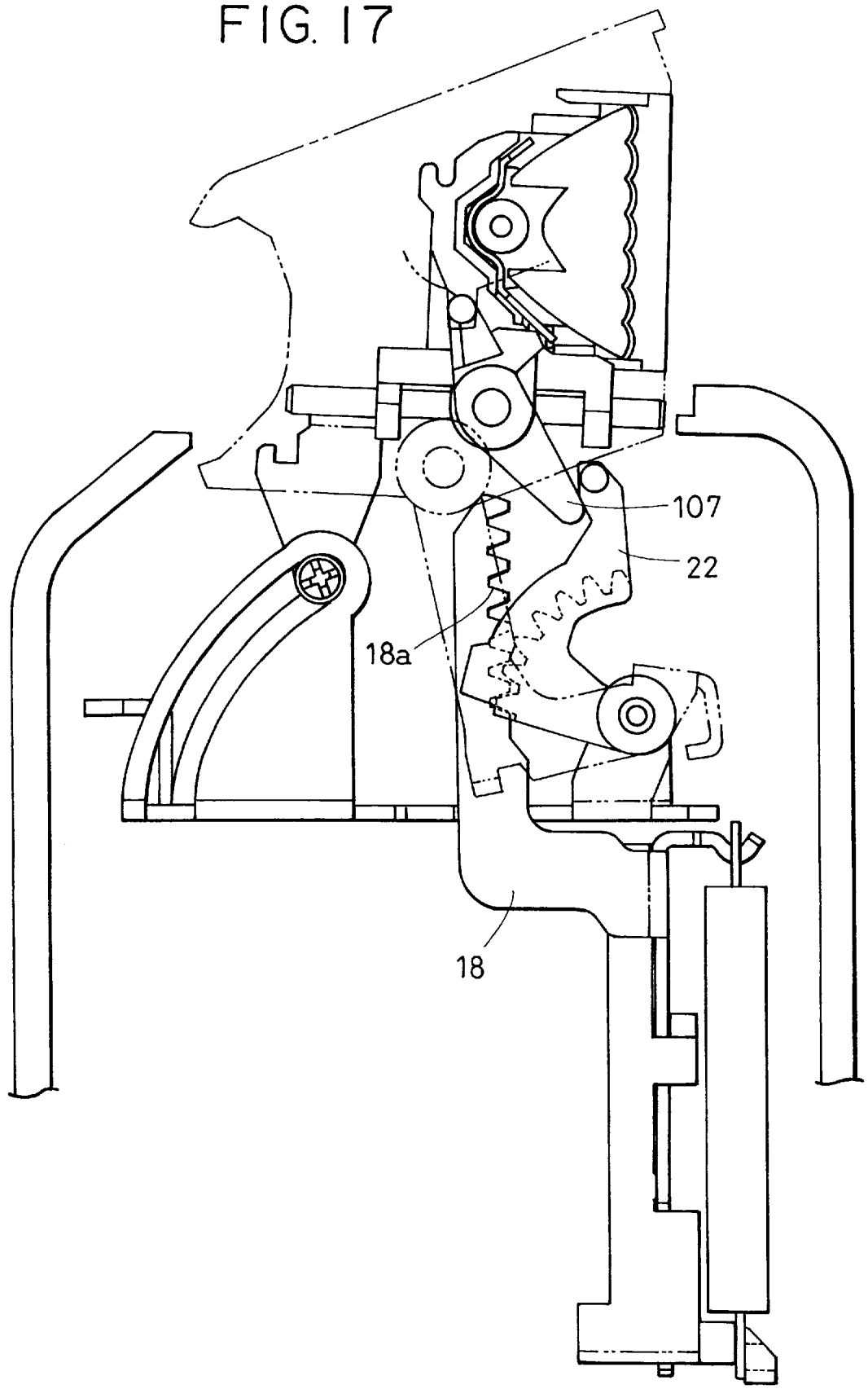
FIG. 17 is a left side view of the linkage components, in which the flash device is in the protruded position in the telephoto mode.

FIGS. 16 and 17 show a state in which the imaging-lens barrel 2 is in the telephoto mode. When a zoom operation toward the telephoto position is performed in the state of the intermediate mode shown in FIGS. 14 and 15, the gear 14 further rotates counterclockwise, whereby the zoom-driving lever 15 pivots clockwise. The rack unit 21 moves to a position higher than that shown in FIGS. 14 and 15, and the light generation unit 150 moves forward. In the telephoto mode, the distance between the prism 106 and the flash window 110 is further reduced.

When a zoom operation is performed toward the wide-angle mode from the telephoto mode, the gear 14 rotates clockwise, and the zoom-driving lever 15 pivots counterclockwise with the interaction between the cam 14a and the shaft 15b, whereby the rack unit 21 is pressed downward, and the light generation unit 150 moves backward.

As described above, the zoom operation is performed by vertically moving the rack unit 21 with the interaction between the cam 14a and the shaft 15b.

The press-down lever 16 does not operate during the zoom operation described above, and it operates in relation to the advancement and withdrawal operation of the flash device 100. Therefore, an idling mechanism for keeping the press-down lever 16 in a waiting mode during the zoom operation is required.

Figure 18:
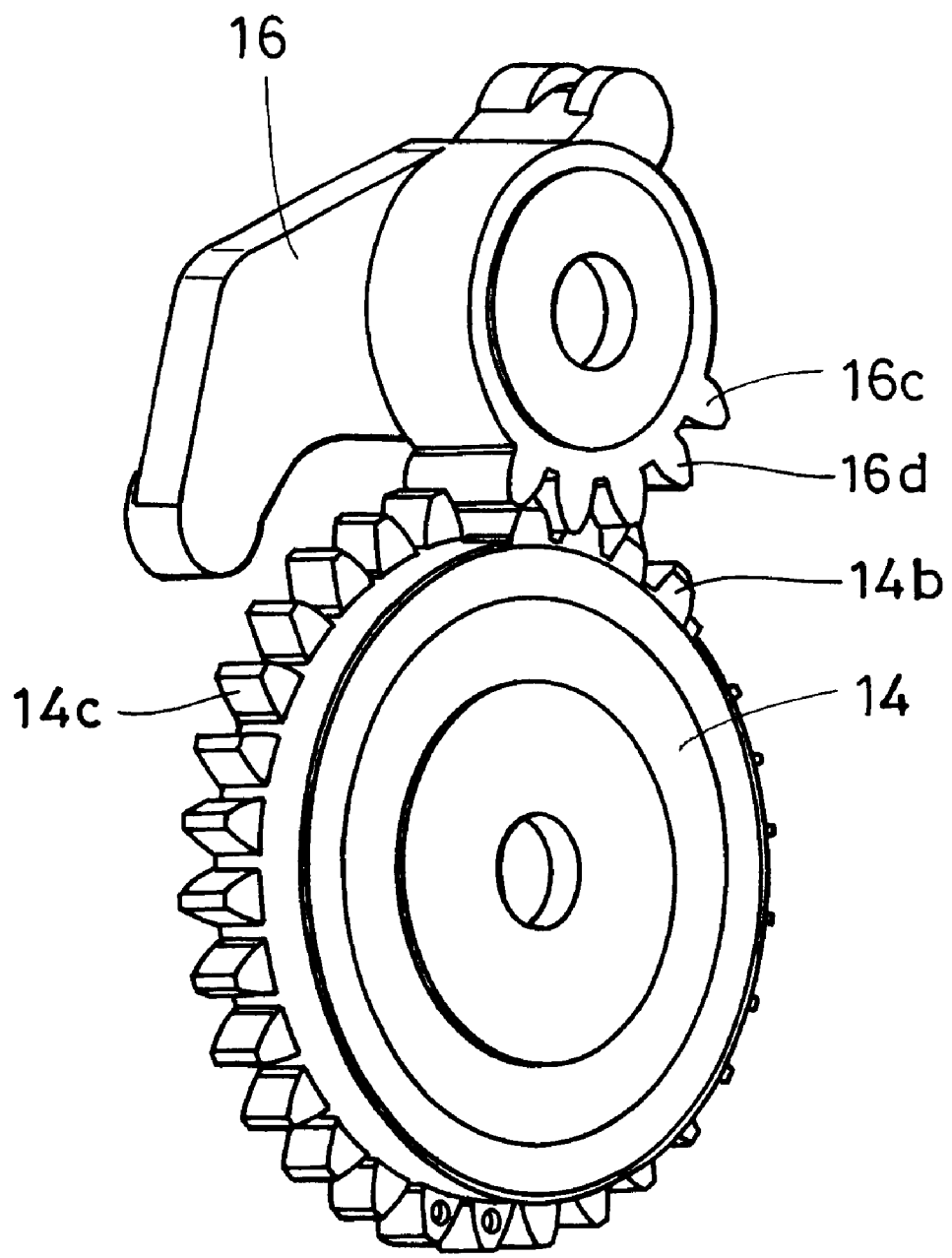
FIG. 18 is a perspective view of a gear 14 and a press-down lever 16, in which the flash device is in the withdrawn position.
Figure 19:
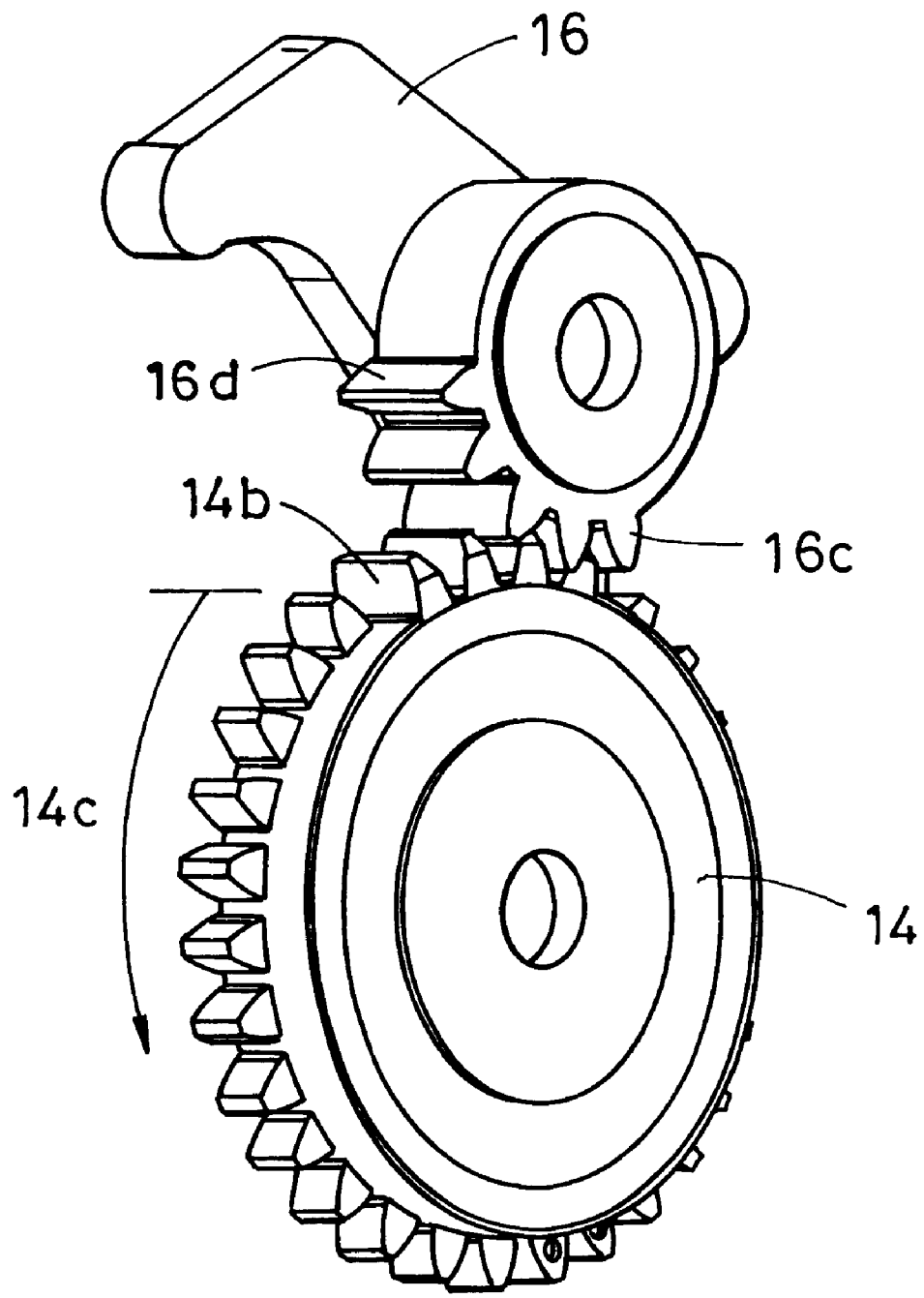
FIG. 19 is a perspective view of the gear 14 and the press-down lever 16, in which the flash device is in the wide-angle mode.

An operation using such an idling mechanism of the press-down lever 16 during the zoom operation is described below with reference to FIGS. 18 to 20. FIG. 18 is an illustration showing a state of the gear 14 and the press-down lever 16, in which the flash device 100 is disposed in the withdrawn position. FIG. 19 is an illustration showing a state of the gear 14 and the press-down lever 16, in which the flash device 100 is disposed in the advanced position in a wide-angle mode. FIG. 20 is an illustration showing a state of the gear 14 and the press-down lever 16, in which the flash device 100 is disposed in the protruded position in an intermediate mode.

In FIG. 18, when the flash device 100 is disposed in the withdrawn position, teeth 14b of the gear 14 and teeth 16d of the press-down lever 16 are engaged with each other, thereby restricting movement of the flash device 100 in the withdrawn position.

In FIG. 19, when the gear 14 rotates counterclockwise, the press-down lever 16 pivots clockwise, and the flash device 100 reaches the protruded position, the flash device 100 is set in the protruded position in the wide-angle mode. In this case, the teeth 14b of the gear 14 and the teeth 16d of the press-down lever 16 are engaged with each other.

When the zoom operation is further performed in the telephoto direction, the gear 14 further rotates counterclockwise. In FIG. 20, the gear of the press-down lever 16 is a sector gear having five teeth, of which a tooth 16c has a thickness smaller than that of the other four teeth 16d. Teeth 14c of the gear 14 are each thinner than one of the teeth 14b, four teeth 14b being provided on the gear 14. The teeth 14c of the gear 14 and the tooth 16c of the press-down lever 16 are offset with respect to each other along the rotational axis, whereby the teeth 14c and the tooth 16c are not engaged with each other.

Since the teeth 14b and 16d of the gear 14 and the press-down lever 16, respectively, are not engaged with each other in the intermediate mode shown in FIG. 20. Only the gear 14 rotates, and the press-down lever 16 does not pivot. When the teeth 14b and 16d finish their engagement, the press-down lever 16 rotates clockwise as a result of urging by the spring 17, and comes into contact with a stopper 1a of the camera body 1 (see, e.g., FIG. 2).

The press-down lever 16 remains in the contact state with the stopper 1a even when the zoom operation is further performed and the gear 14 thereby rotates. The rotational angle of the gear 14 is set so that none of the teeth 14b and the tooth 16c are brought into contact with each other even when the gear 14 further rotates and reaches the position in the telephoto mode shown in FIG. 16.

When zooming is performed in the wide-angle direction, the gear 14 rotates clockwise, the tooth 16c of the press-down lever 16 engages, between the intermediate and wide-angle modes, with one of the teeth 14d of the gear 14 nearest to the tooth 16c, and the teeth 16d and 14b engage with each other in a normal engaged state, thereby moving to the wide-angle mode.

A withdrawing operation of the flash device 100 is described below. When the power source is switched off, the motor 3 drives the imaging-lens barrel 2 in the collapsing direction, and the gears 11, 12, 13, and 14 operate, thereby pivoting the press-down lever 16 counterclockwise. The rack unit 21 is pressed downward, and the flash device 100 is driven to the withdrawn position from the protruded position by the sector-gear lever 22 and the flash-unit-driving arms 23 mating with each other.

In the camera according to the present embodiment, the flash device 100 advances and withdraws in mechanical linkage with the protruding and collapsing movements of the imaging-lens barrel 2, which are performed by an on-off operation of the power for the camera. The operational region of the rack unit 21 and the sector-gear lever 22 is divided into two consecutive regions, and the protrusion-withdrawal and the illumination-angle variation of the flash device 100 are performed according to the two regions, respectively.

Driving structures, which differ from each other, for converting the movement of the imaging-lens barrel 2 into the movement of the rack unit 21 and the sector-gear lever 22 are used depending on the two operational regions. That is, a wide range of movement is obtained by gear coupling of the press-down lever 16 in the protrusion-withdrawal of the flash device 100, and a minute range of movement of the zoom-driving lever 15 is obtained by using the cam 14a in the illumination-angle variation of the flash device 100. With this arrangement, a small amount of movement in the protrusion and collapsing of the imaging-lens barrel 2 can be converted into a wide range of movement of the flash device 100 between the protruded position and the withdrawn position, and a large amount of movement in zooming of the imaging-lens barrel 2 can be converted to a minute range of movement of the light generation unit 150.

Figure 21:
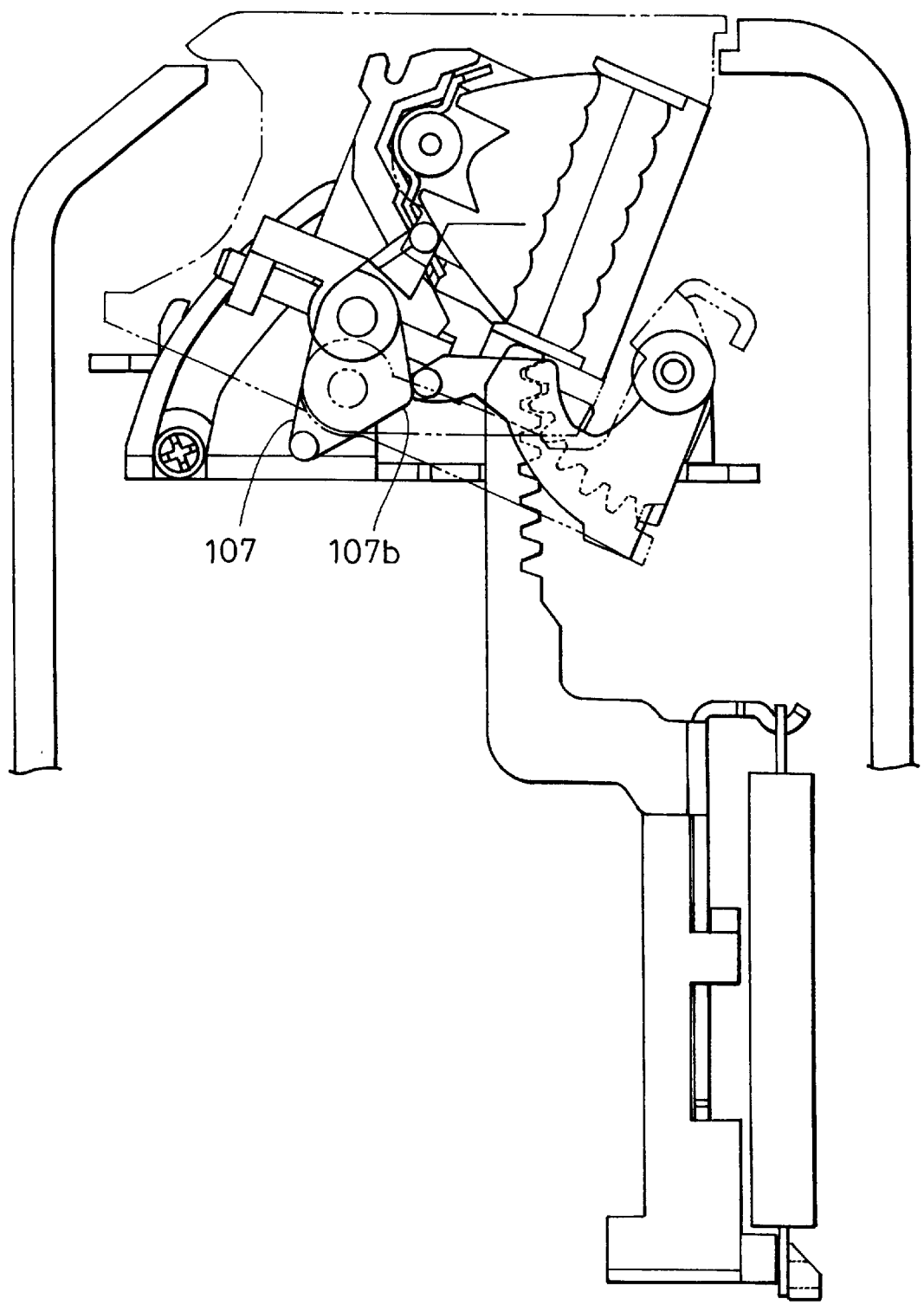
FIG. 21 is an illustration of a modified example of the flash device of the camera according to the present invention, in which the distance between a prism 106 and a flash window 110, when the flash device is in the withdrawn position, is greater than that in a case where the flash device is in the telephoto mode.
Figure 22:
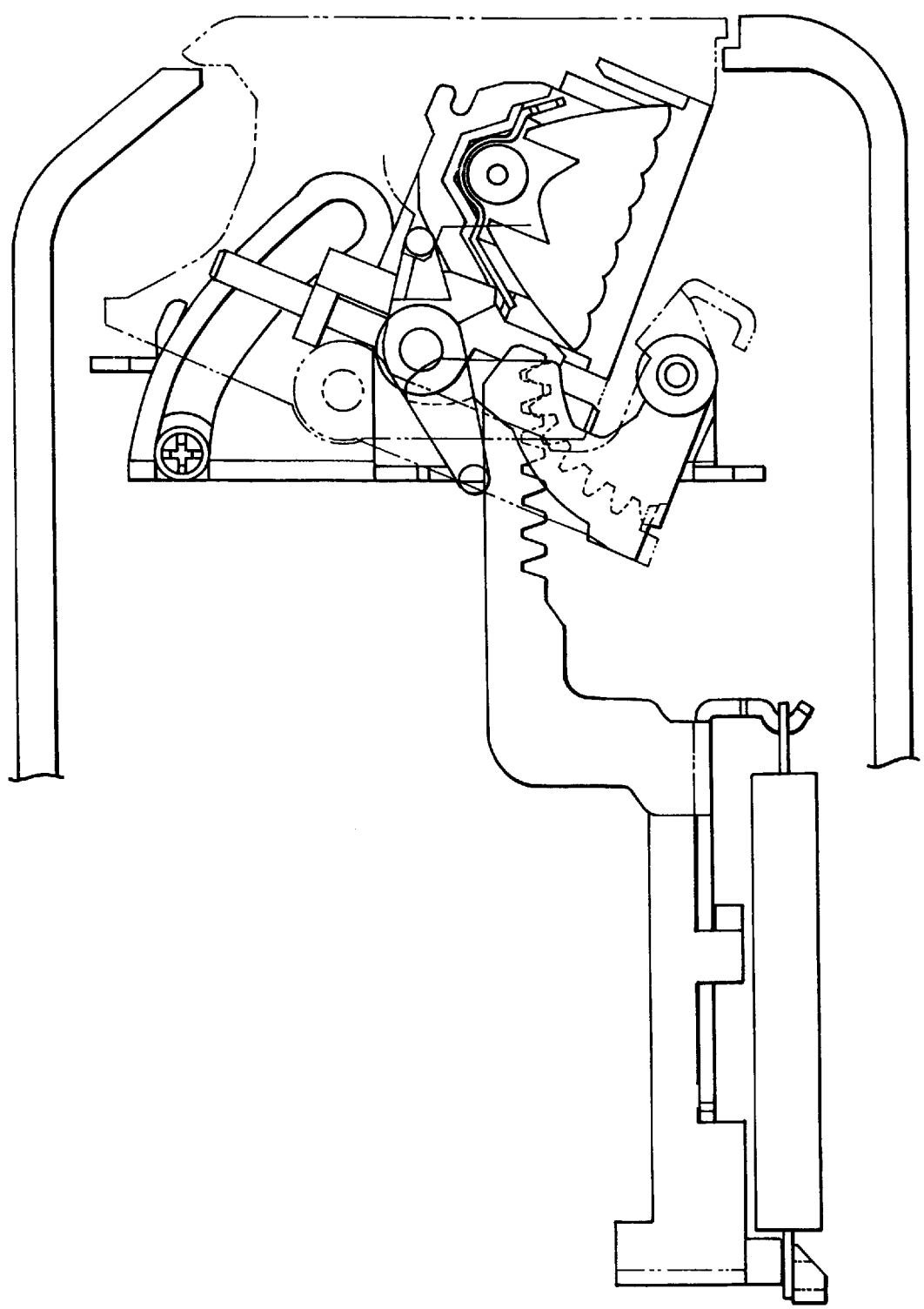
FIG. 22 is an illustration of another example of the flash device of the camera according to the present invention, in which the distance between the prism 106 and the flash window 110, when the flash device is in the withdrawn position, is smaller than that in the case where the flash device is in the telephoto mode.

Modified examples of the embodiment according to the present invention are described below with reference to FIGS. 21 and 22. FIGS. 21 and 22 each show a state in which the flash device 100 is disposed in the withdrawn position. In the modified example shown in FIG. 21, an arm 107b of the zoom lever 107 is formed as a cam. With this arrangement, the light generation unit 150 can move backward further than in the case shown in FIG. 8. The light generation unit 150 can also move backward further than that in the wide-angle mode shown in FIG. 12. Therefore, spaces can be provided in front of and under the light generation unit 150, in which, for example, a light generation circuit board may be mounted.

The other modified example is shown in FIG. 22, in which the shaft 22b of the sector-gear lever 22 is eliminated. When the shaft 22b is eliminated, the light generation unit 150 can move forward until the prism 106 comes into contact with the flash window 110 because a counterclockwise pivoting movement of the zoom lever 107 is not restricted. With this arrangement, the light generation unit 150 can move forward further than that in the telephoto mode shown in FIG. 17, whereby a large space can be provided behind the light generation unit 150, in which a light generation circuit board or other components may be mounted, as in the modified example described above.

By devising the shape of the arm 107b and the position of the shaft 22b, the light generation unit 150 can be restricted in the wide-angle position, a position further backward than the wide-angle position, the telephoto position, a position further forward than the telephoto position, or the intermediate position during movement of the flash device 100 between the withdrawn position and the protruded position. With this arrangement, large spaces can be provided in front of and under the light generation unit 150, behind the same, or in front of and behind the same, in which other components may be mounted, thereby contributing to reduction of the size of the camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
   a flash device movable between a withdrawn position, in which said flash device is received in a camera body, and an in-use position, in which said flash device protrudes from the camera body including a light source and an optical panel;
   an illumination-angle-varying mechanism that changes an illumination angle of said flash device and includes a first lever that changes a distance between the light source and the optical panel;
   a lens barrel which is movable to achieve magnification variation;
   an operation-linkage mechanism that mechanically links movement of the lens barrel with movement of said flash device between the withdrawn position and the in-use position and operation of said illumination-angle-varying mechanism while said flash device is moving between the withdrawn position and the in-use position; and
   a second lever, mechanically coupled to the first lever, which moves in mechanical linkage with the movement of the lens barrel and is engaged with the first lever,
   wherein the illumination-angle-varying mechanism moves when the first lever is driven by the second lever while the flash device moves between the withdrawn position and the in-use position.

2. A camera according to claim 1, wherein an urging member urges said flash device toward the in-use position.

3. A camera according to claim 1, wherein said lens barrel is rotated about an optical axis of said lens barrel by a motor.

4. A camera comprising:
   a flash device movable between a withdrawn position, in which said flash device is received in a camera body, and an in-use position, in which said flash device protrudes from the camera body;
   a lever member that changes an illumination angle of said flash device;
   a lens barrel which is movable to achieve magnification variation, and mechanically linked with said flash device such that said flash device moves between the withdrawn position and the in-use position in linkage with movement of said lens barrel; and
   a driving member that operates said lever member while said flash device moves between the withdrawn position and the in-use position.
   wherein said driving member is mechanically coupled with said lever member and operates in mechanical linkage with movement of said lens barrel to drive said lever member.

5. A camera according to claim 4, wherein said flash device includes a light source and an optical panel, and movement of said lever member changes a distance between said light source and said optical panel.

6. A camera according to claim 4, wherein an urging member urges said flash device toward the in-use position.

* * * * *

UNITED STATES PATENT AND TRADEMARK OFFICE
CERTIFICATE OF CORRECTION

PATENT NO. : 6,535,690 B2
DATED : March 18, 2003
INVENTOR(S) : Minoru Tanabe

It is certified that error appears in the above-identified patent and that said Letters Patent is hereby corrected as shown below:

Column 5,
Line 35, "10c;" should read -- 101c; --.

Column 6,
Line 55, "derection" should read -- direction --.

Column 12,
Line 55, "position." should read -- position, --.

Signed and Sealed this

Sixth Day of January, 2004

JAMES E. ROGAN
*Director of the United States Patent and Trademark Office*